United States Patent
Hamada

(10) Patent No.: US 8,717,602 B2
(45) Date of Patent: May 6, 2014

(54) CLOUD COMPUTING SYSTEM, DOCUMENT PROCESSING METHOD, AND STORAGE MEDIUM IN WHICH A NUMBER OF PROCESSING UNITS IS ADJUSTED BASED ON PROCESSING STATUS

(75) Inventor: Yoshinobu Hamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 429 days.

(21) Appl. No.: 13/091,560

(22) Filed: Apr. 21, 2011

(65) Prior Publication Data

US 2011/0286037 A1 Nov. 24, 2011

(30) Foreign Application Priority Data

May 18, 2010 (JP) ................................ 2010-114353

(51) Int. Cl.
*G06F 3/12* (2006.01)
(52) U.S. Cl.
USPC ........ 358/1.15; 358/1.13; 358/1.14; 709/201; 718/105; 382/234; 382/303; 382/304
(58) Field of Classification Search
CPC .................... G06F 17/30247; G06F 17/30648; G06F 3/124; G06F 3/1211; G06F 3/1241; G06F 3/126; G06F 3/0644; G06F 9/5083; G06K 9/00463; G06K 9/6262; G06K 9/6217; H04L 67/1002; H04L 67/1008; H04L 67/1014; H04L 67/1029
USPC ........ 358/1.13, 1.14, 1.15; 709/201; 718/105; 382/234, 303, 304
See application file for complete search history.

(56) References Cited

U.S. PATENT DOCUMENTS

| | | | |
|---|---|---|---|
| 2007/0201078 A1* | 8/2007 | Morales et al. | 358/1.15 |
| 2007/0285706 A1* | 12/2007 | Nguyen et al. | 358/1.15 |
| 2011/0007347 A1* | 1/2011 | Kamath et al. | 358/1.15 |
| 2011/0299112 A1* | 12/2011 | Ota | 358/1.15 |

FOREIGN PATENT DOCUMENTS

JP 11-194910 7/1999

* cited by examiner

*Primary Examiner* — Jacky X Zheng
(74) *Attorney, Agent, or Firm* — Fitzpatrick, Cella, Harper & Scinto

(57) ABSTRACT

A reception processing unit provided in a document processing system receives a document data processing request from a user device. A division processing unit divides document data corresponding to the processing request and generates divided document data. A document processing unit performs document processing for the divided document data, and a coupling processing unit combines the document-processed divided document data. A resource management unit increases or decreases the number of the division processing units, the document processing units, and the coupling processing units in response to the processing status of each thereof.

5 Claims, 21 Drawing Sheets

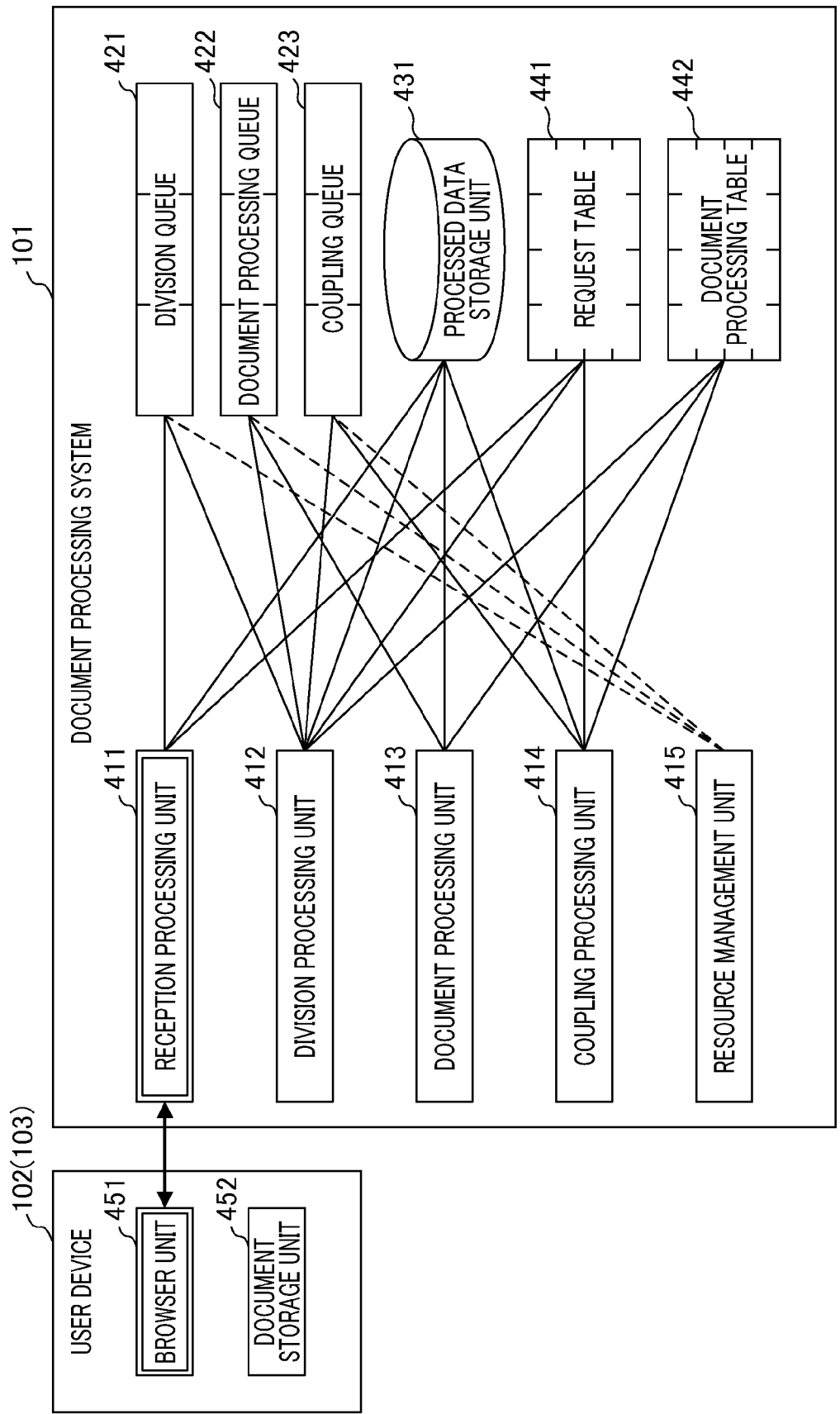

| Request ID | Document data URI | Status | The number of pieces |
|---|---|---|---|
| 100 | http://aaa.bbb.ccc/req/doc100 | Completed | 8 |
| 101 | http://aaa.bbb.ccc/req/doc101 | Divided | 5 |
| 102 | http://aaa.bbb.ccc/req/doc102 | Prior to division | |
| ... | ... | ... | ... |

| Request ID | Piece number | Piece URI | Status |
|---|---|---|---|
| 100 | 1 | http://aaa.bbb.ccc/div/doc100_1 | Completed |
| ... | ... | ... | ... |
| 100 | 8 | http://aaa.bbb.ccc/div/doc100_8 | Completed |
| 101 | 1 | http://aaa.bbb.ccc/div/doc101_1 | Completed |
| 101 | 2 | http://aaa.bbb.ccc/div/doc101_2 | Not completed |
| 101 | 3 | http://aaa.bbb.ccc/div/doc101_3 | Completed |
| 101 | 4 | http://aaa.bbb.ccc/div/doc101_4 | Not completed |
| 101 | 5 | http://aaa.bbb.ccc/div/doc101_5 | Not completed |
| ... | ... | ... | ... |

| Processing unit | Type of VM | Number of initial instances |
|---|---|---|
| Reception processing unit | Web Role | 2 |
| Division processing unit | Worker Role | 2 |
| Document processing unit | Worker Role | 10 |
| Coupling processing unit | Worker Role | 2 |
| Resource management unit | Worker Role | 1 |

FIG. 14

| Processing unit | Type of VM | Performance | Number of initial instances |
|---|---|---|---|
| Reception processing unit | Web Role | Low | 2 |
| Reception processing unit | Web Role | High | 0 |
| Division processing unit | Worker Role | Low | 2 |
| Division processing unit | Worker Role | High | 1 |
| Document processing unit | Worker Role | Low | 10 |
| Document processing unit | Worker Role | High | 5 |
| Coupling processing unit | Worker Role | Low | 2 |
| Coupling processing unit | Worker Role | High | 1 |
| Resource management unit | Worker Role | Low | 1 |
| Resource management unit | Worker Role | High | 0 |

443

| Processing unit | Type of VM | Performance | Number of initial instances |
|---|---|---|---|
| Reception processing unit | Web Role | Low | 2 |
| Division processing unit | Worker Role | Low | 2 |
| Document processing unit | Worker Role | Low | 10 |
| Document processing unit | Worker Role | High | 5 |
| Coupling processing unit | Worker Role | Low | 2 |
| Resource management unit | Worker Role | Low | 1 |

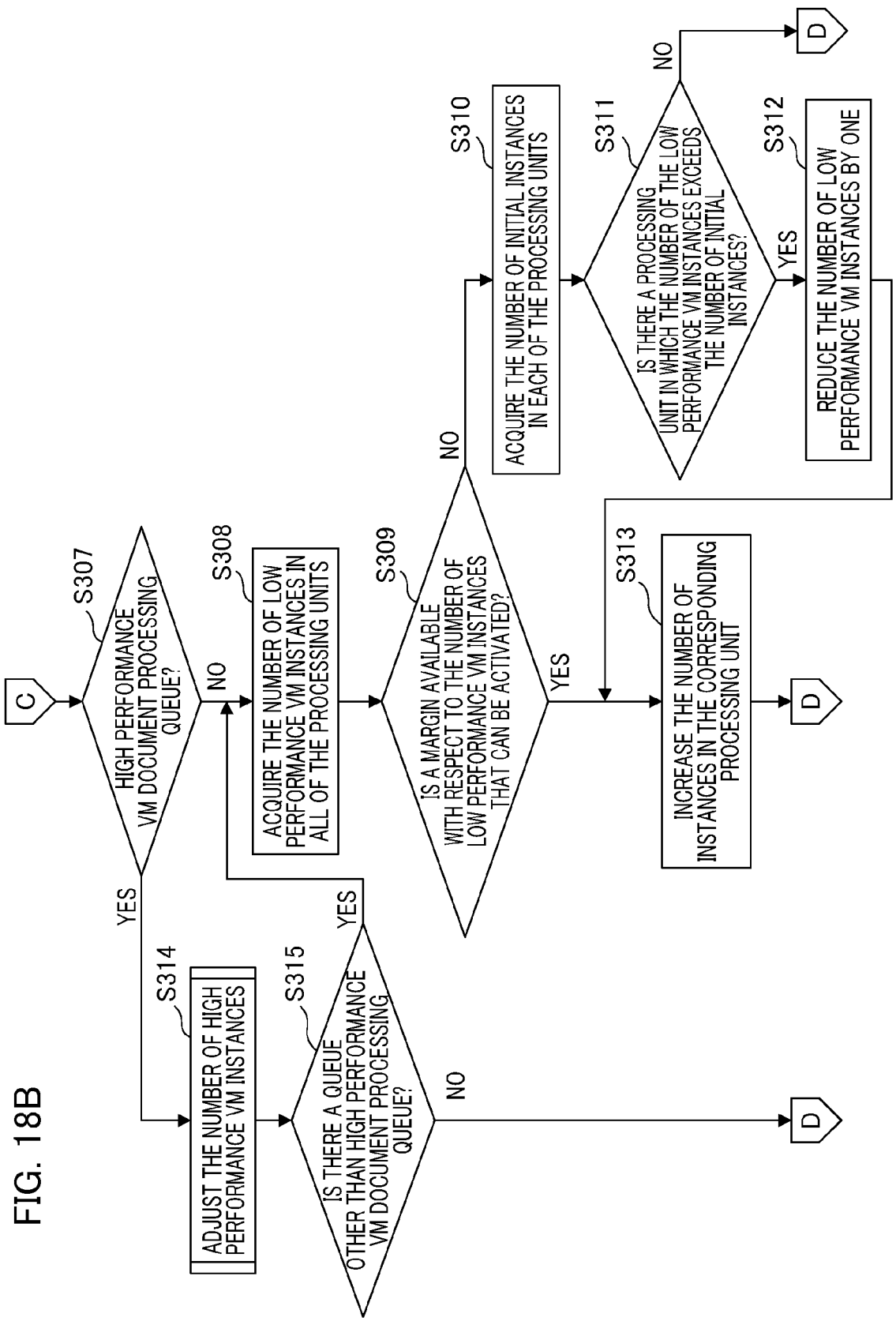

CLOUD COMPUTING SYSTEM, DOCUMENT PROCESSING METHOD, AND STORAGE MEDIUM IN WHICH A NUMBER OF PROCESSING UNITS IS ADJUSTED BASED ON PROCESSING STATUS

BACKGROUND OF THE INVENTION

1. Field of the Invention

The present invention relates to a cloud computing system, a document processing method, and a storage medium.

2. Description of the Related Art

A system that divides data to be processed into a plurality of blocks upon reception of a single processing request, performs processing simultaneously in parallel using a plurality of processing modules, combines the processing results, and then outputs these results as the result for the processing request has been proposed. For example, Japanese Patent Laid-Open No. 11-194910 discloses a network printer apparatus that divides print data received from a terminal device, assigns the divided print data to the respective printer engines, and then sorts and outputs print data output by the respective printer engines.

On the other hand, a utilization configuration of a computer referred to as "cloud computing" (hereinafter referred to simply as "cloud") has recently been proposed. In the cloud environment, a user utilizes computer processing as a service via network. By constructing a network service system on a cloud environment, a service provider is not responsible for the maintenance and management of hardware, and only needs to pay a fee for the necessary computer resources that have been employed to a cloud business enterprise. Therefore, cost saving and a flexible increase or decrease in resources may be realized.

SUMMARY OF THE INVENTION

The cloud computing system of the present invention is a system that divides and processes data to be processed upon reception of a document data processing request, and combines the processing results. The system may increase or decrease the number of processing executing entities depending on the state of processing.

According to an aspect of the present invention, a cloud computing system is provided that includes a request reception unit configured to be realized by executing a request reception program that stores a message corresponding to a job in a storage unit in response to the reception of a processing request for the job from an image forming apparatus; a back-end processing unit configured to be realized by executing a back-end processing program that makes an acquisition request for the message to the storage unit at regular intervals, and when the message has been acquired from the storage unit, performs processing based on the acquired message, wherein the back-end processing unit includes a division processing back-end processing unit configured to generate divided document data by dividing document data corresponding to the processing request received by the request reception unit, a document processing back-end processing unit configured to perform document processing for the divided document data, and a coupling processing back-end processing unit configured to connect the document-processed divided document data, and a management unit configured to provide instructions to increase or decrease the number of the division processing back-end processing units, the document processing back-end processing units, and the coupling processing back-end processing units in response to the processing status of each thereof.

Further features of the present invention will become apparent from the following description of exemplary embodiments with reference to the attached drawings.

BRIEF DESCRIPTION OF THE DRAWINGS

FIG. 4 is a functional block diagram illustrating examples of a user device and a document processing system.

FIG. 5A is a diagram illustrating an example of a request table.

FIG. 5B is a diagram illustrating an example of a document processing table.

FIG. 14 is a diagram illustrating an example of an initial instance number management table.

FIGS. 18A and 18B show a flowchart illustrating operation processing performed by a resource management unit.

DESCRIPTION OF THE EMBODIMENTS

In the aforementioned technology disclosed in Japanese Patent Laid-Open No. 11-194910, a computer resource required for processing is physically fixed, and thus cannot be increased or decreased in a flexible way. Also, when a computer resource is increased or decreased in a cloud environment, such processing has conventionally been manually performed using a management tool in most cases. Thus, in particular, in a system that divides and processes data to be processed upon reception of a single processing request, and combines the processing results, such a system has a drawback that the computer resources cannot be increased or decreased in a flexible way for effective usage. According to the system of the present embodiment to be described below, such drawback can be avoided.

Figure 1:
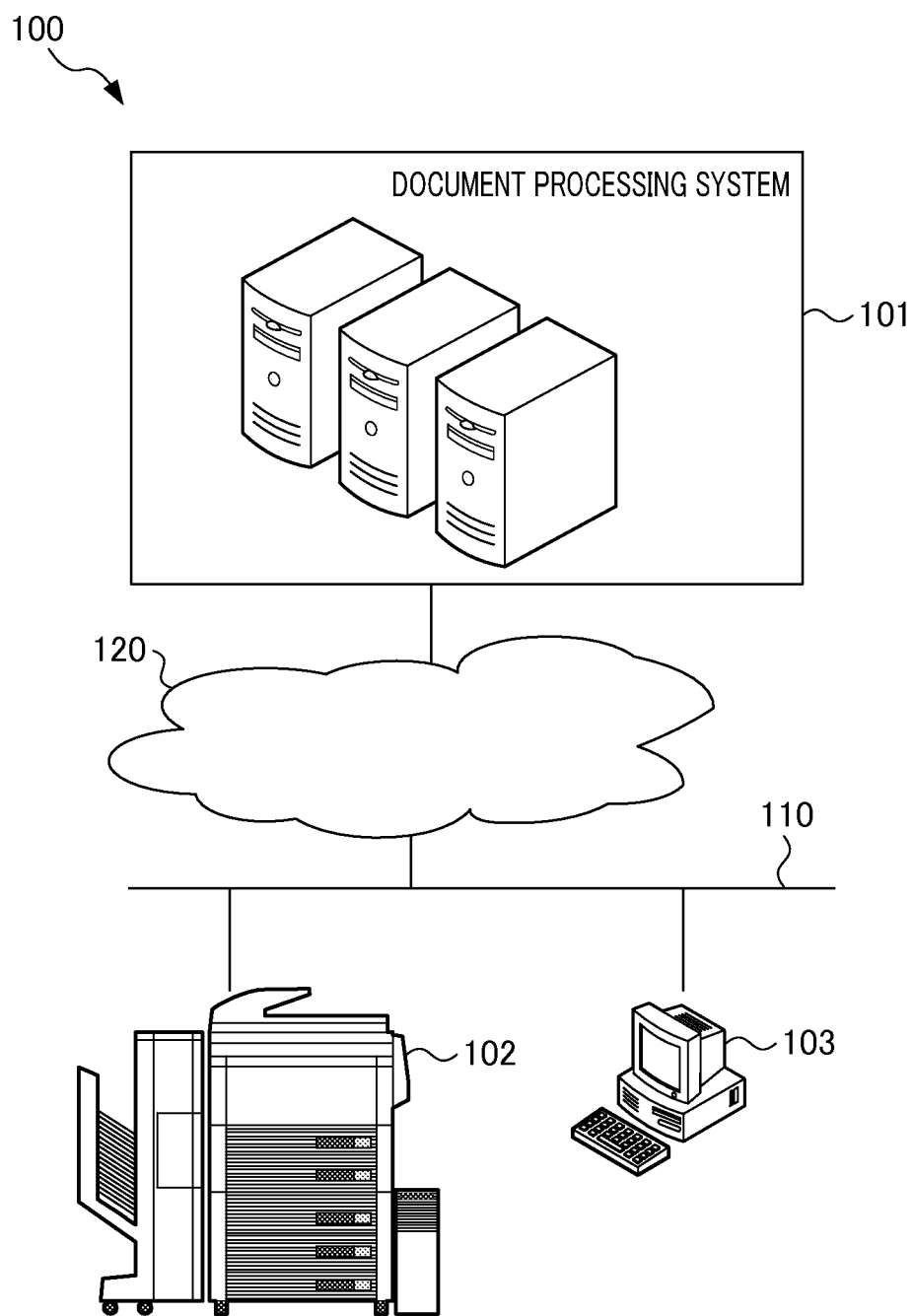
FIG. 1 is a diagram illustrating an example of the configuration of a system of the present embodiment.

FIG. 1 is a diagram illustrating an example of the configuration of a system of the present embodiment. The system shown in FIG. 1 includes a document processing system 101, a PC (Personal Computer) 103, and an MFP (Multi Function Peripheral) 102. The document processing system 101 includes a server group, and is connected to a network 120 such as Internet or the like. Also, the PC 103 and the MFP 102, which are user devices operated by a user, are connected to a network 120 via a LAN 110.

In the present embodiment, the LAN 110 is blocked by a firewall from the network 120. In other words, the MFP 102 and the PC 103 are disposed at a local area where access from the outside is limited. Also, the document processing system 101 is a cloud computing system provided in a cloud. The cloud is an area at which a server group is disposed in a cloud computing environment. In the cloud computing environment, a user utilizes computer processing as a service via the network. Access to the inside of the firewall cannot be made by a request made from the document processing system 101 provided in the cloud. Accordingly, the document processing system 101 communicates with the MFP 102 or the PC 103 by returning a response to the request from the MFP 102 or the PC 103. The document processing method of the present embodiment is realized by the system shown in FIG. 1. Also, the storage medium of the present embodiment is a storage medium storing a computer program for causing a computer to execute the document processing method.

Figure 2:
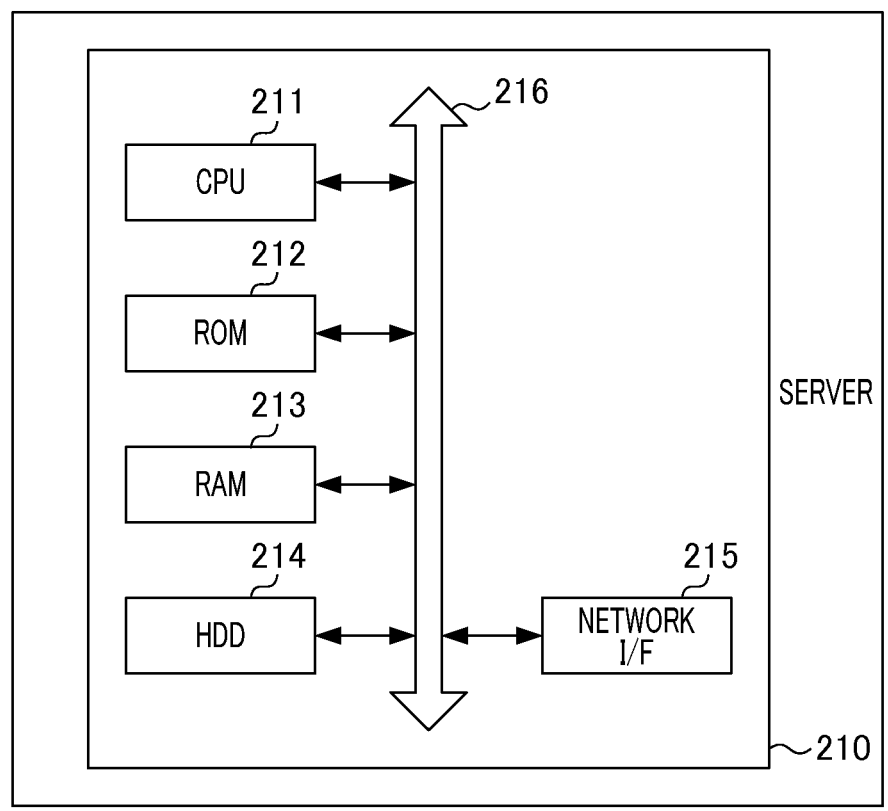
FIG. 2 is a diagram illustrating an example of the hardware configuration of a server.

FIG. 2 is a diagram illustrating an example of the hardware configuration of a server included in a server group provided in the document processing system. A control unit 210 controls the operation of the server. The control unit 210 includes a CPU (Central Processing Unit) 211, a ROM (Read Only Memory) 212, and a RAM (Random Access Memory) 213. The control unit 210 further includes an HDD (Hard Disk Drive) 214, and a network I/F (Interface) 215. The processing sub-units provided in the control unit 210 are connected to the bus 216.

The CPU 211 controls the whole control unit 210. The CPU 211 reads a control program pre-stored in the ROM 212 and the HDD 214 and then executes various control processes such as reading control, transmission control, and the like. The RAM 213 is employed as a temporary storage area for the main memory of the CPU 211, the work area, and the like. The HDD 214 stores image data and various programs. The network I/F 215 connects the control unit 210 to the network 120, and performs transmission and reception of information with external devices on the network 120.

Figure 3:
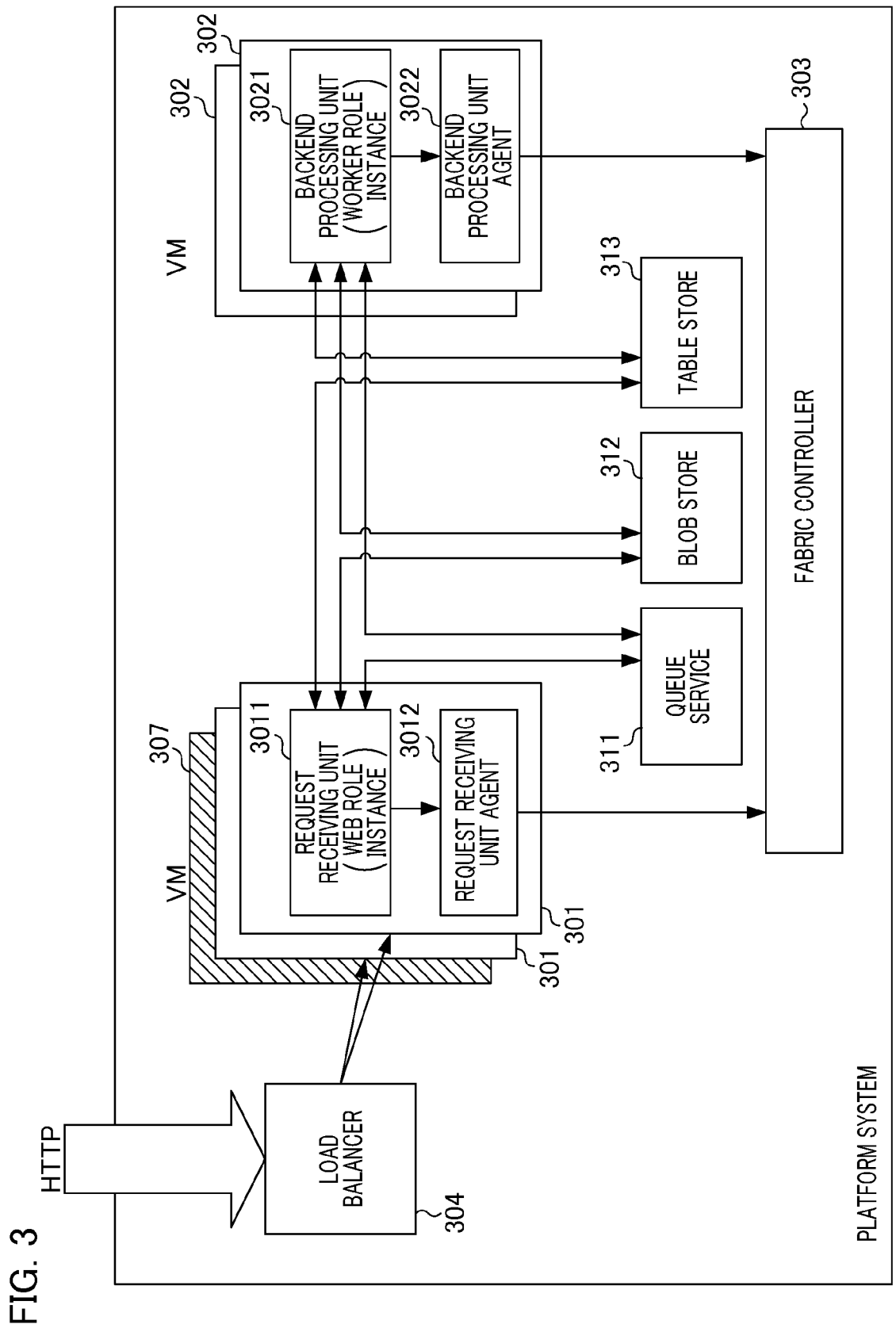
FIG. 3 is a diagram illustrating an example of a platform system provided by a server group provided in a document processing system.

FIG. 3 is a diagram illustrating an example of a platform system (operating system) provided by a server group provided in the document processing system. The platform system is realized by the fact that the CPU 211 of each server constituting a server group executes a control program stored in the ROM 212 or the HDD 214 while employing the RAM 213 as a temporary storage area. Also, the platform system utilizes the RAM 213 or the HDD 214 as a storage area. A user of the platform may employ a physical hardware resource in a server group 101 as a computing resource.

The platform system shown in FIG. 3 includes a plurality of VMs 301 and 302, a fabric controller 303, a load balancer 304, a queue service 311, a blob store 312, a table store 313, and a management VM 307. VM is an abbreviation for Virtual Machine. VM is a logical computer that operates with an independent operating system using a virtual technology on the group of physical servers 101 provided in the document processing system 101. The unit of such logical computer is referred to as "instance". In the present embodiment, a single instance operates on a single server constituting a server group.

The VM 301 includes a request reception unit (Web Role instance) 3011 and a request reception unit agent 3012. The request reception unit 3011 receives a processing request from a user device via the load balancer 304. Also, the request reception unit 3011 transmits a processing request to a back-end processing unit 3021 via the queue service 311. The request reception unit agent 3012 collects various information including the use state of the VM 301, the operation status of the request reception unit 3011, the use state of the resource of the VM 301, and an error occurred on the request reception unit 3011, and transmits various information to the fabric controller 303 at regular intervals.

The VM 302 includes a back-end processing unit (Worker Role instance) 3021 and a back-end processing unit agent 3022. The back-end processing unit 3021 receives a processing request made from the request reception unit 3011 via the queue service 311. The back-end processing unit 3021 executes the processing request that has been received from the request reception unit 3011 via the queue service 311. Also, the back-end processing unit 3021 can be scaled out. Scale-out refers to the fact that the number of VMs 302 increases and thus the number of instances of the back-end processing unit 3021 increases. Increasing the number of instances of the back-end processing unit 3021 improves a processing performance, whereby results for a plurality of processing requests made from a user device can be returned more quickly.

The fabric controller 303 manages the respective instances in the request reception unit 3011 and the back-end processing unit 3021. With this arrangement, the scalability and the availability of the respective instances may be ensured. For example, in the request reception unit 3011 or the back-end processing unit 3021, assume the case where a certain specific instance may be halted due to failure of the server. In this case, the fabric controller 303 does not receive a periodical report from the request reception unit agent 3012 or the back-end processing unit agent 3022 corresponding to the halted instance. Then, the fabric controller 303 provides an instruction to the VM corresponding to the halted instance to assign the processing to a new instance. Consequently, the number of instances that are executing processes is kept constant, whereby processing delay may be suppressed.

The load balancer 304 centrally manages a request (here, communication via HTTP) from an external network, and selectively transfers requests to a plurality of VMs having a function of an equivalent request reception unit. With this arrangement, the high availability of the request reception unit 3011 is ensured. The management VM 307 includes a request reception unit 3011 and a request reception unit agent 3012. This differs from the VM 301 in that the management VM 307 is a VM having the instance, which can only be utilized by an administrative user, of the request reception unit 3011.

The queue service 311 provides a service by which the respective instances asynchronously communicate data. For example, the request reception unit 3011 writes information relating to a job that is to be executed by the back-end processing unit 3021 as a message in a queue. The back-end processing unit 3021 reads the message written in the queue, and executes processing based on the read information. The blob store 312 provides a function that stores binary formatted data. The table store 313 provides a function that stores table format data.

FIG. 4 is a functional block diagram illustrating examples of a user device and a document processing system described in the first example. A user device 102 (103) includes a browser unit 451 and a document storage unit 452. The browser unit 451 accesses the document processing system 101, and makes a request to the document processing system 101 as well as receives a response to the request. More specifically, the browser unit 451 transmits a document processing request, i.e., a request for processing document data stored in the document storage unit 452, to the document processing system 101. Also, the browser unit 451 transmits a processing result acquisition request to the document processing system 101, and receives the processed document data. The processing result acquisition request is a request for transmitting the document data processed by the document processing system 101.

The document storage unit 452 stores document data that a user device has read from, for example, a recording medium, and document data for the processing result that the browser unit 451 has received from a document service 400. When a user device is an MFP, the user device may include a processing unit for printing a document stored in the document storage unit 452, a processing unit for scanning and digitalizing a printed matter and storing it in the document storage unit 452, and the like.

The document processing system 101 shown in FIG. 4 includes a reception processing unit 411, a division processing unit 412, a document processing unit 413, a coupling processing unit 414, a resource management unit 415, a division queue 421, a document processing queue 422, and a coupling queue 423. The document processing system 101 further includes a processed data storage unit 431, a request table 441, and a document processing table 442. The function of the document processing system 101 shown in FIG. 4 is realized by the platform system described with reference to FIG. 3.

Each of the division queue 421, the document processing queue 422, and the coupling queue 423 is a queue that stores a job to be processed as a message. The division queue 421 is a queue that corresponds to the division processing unit 412. The document processing queue 422 is a queue that corresponds to the document processing unit 413. The coupling queue 423 is a queue that corresponds to the coupling processing unit 414.

The reception processing unit 411 receives a document processing request or a processing result acquisition request from the browser unit 451 provided in the user device. The reception processing unit 411 is realized by a Web Role instance 3011 shown in FIG. 3. In response to the reception of a job processing request from the user device, the Web Role instance 3011 stores a message corresponding to the job in a storage unit (queue). More specifically, when the reception processing unit 411 receives a document processing request, the reception processing unit 411 writes the necessary information in the request table 441 and the processed data storage unit 431 in order to cause the division processing unit 412 to perform processing. Also, the reception processing unit 411 stores a message corresponding to a job indicating a request in the division queue 421. Then, the reception processing unit 411 returns a request ID to the request source. The request ID is an identifier that the reception processing unit 411 assigns for each document request. In a processing result acquisition request, the request ID is employed for identifying result acquisition processing. When the processing of a request ID included in the request has been completed upon reception of a processing result acquisition request from the reception processing unit 411, the data of the processing result is acquired from the processed data storage unit 431 and is returned to the request source. In other words, in response to the reception of a job processing request from a user device (e.g., the image forming apparatus 102), the reception processing unit 411 functions as a request reception unit that stores a message corresponding to the job in a storage unit (the division queue 421). The request reception unit is realized by executing a request reception program.

Each of the division processing unit 412, the document processing unit 413, and the coupling processing unit 414 is a back-end processing unit. The back-end processing unit is realized by the Worker Role instance 3021 shown in FIG. 3. The back-end processing unit makes a message acquisition request to a storage unit, in which a message by a Web Roll instance 3011 is stored, at regular intervals. When the back-end processing unit acquires a message from the storage unit, the back-end processing unit performs processing based on the acquired message. The back-end processing unit is realized by executing a back-end processing program.

The division processing unit 412 functions as a division processing back-end processing unit that divides document data corresponding to the processing request (document processing request) received by the reception processing unit 411 to thereby generate the divided document data (hereinafter referred to as a "piece"). The function of the division processing unit 412 is realized by the Worker Role instance 3021 shown in FIG. 3. The division processing unit 412 retrieves a message from the division queue 421, and further acquires the necessary information from the request table 441 and the processed data storage unit 431 to thereby perform division processing for document data to be processed. Then, in order to cause the document processing unit 413 to process the piece, i.e., the division processing result, the necessary information is written in the request table 441, the document processing table 442, the processed data storage unit 431, and the document processing queue 422.

The document processing unit 413 functions as a document processing back-end processing unit that performs document processing for pieces. The function of the document processing unit 413 is realized by the Worker Role instance 3021 shown in FIG. 3. The document processing unit 413 retrieves a message from the document processing queue 422, and further acquires the necessary information from the document processing table 442 and the processed data storage unit 431 to thereby execute processing for pieces. Then, in order to cause the coupling processing unit 414 to process data of the processing result for piece (hereinafter referred to as "processed piece"), the necessary information is written in the document processing table 442 and the processed data storage unit 431. Note that the document processing unit 413 is assumed to process pieces simultaneously using a plurality of instances. Therefore, more instances than those disposed in other processing units are normally assigned to the document processing unit 413.

The coupling processing unit 414 functions as a coupling processing back-end processing unit that combines divided document data subjected to document processing, i.e., processed pieces. The function of the coupling processing unit 414 is realized by the Worker Role instance 3021 shown in FIG. 3. The coupling processing unit 414 retrieves a message from the coupling queue 423 and acquires the necessary information from the request table 441, the document processing table 442, and the processed data storage unit 431.

Then, the coupling processing unit 414 performs processing for coupling processed pieces together in the order. Also, the coupling processing unit 414 stores the coupling result in the processed data storage unit 431 as well as updates the content of the request table 441.

The resource management unit 415 functions as a management unit that increases or decreases the number of the division processing units 412, the document processing units 413, and the coupling processing units 414 (back-end processing units) in response to the processing status of each thereof. The function of the resource management unit 415 is realized by the Worker Role instance 3021 shown in FIG. 3. More specifically, the resource management unit 415 monitors the number of unprocessed messages (the number of jobs) that are stored in each of the division queue 421, the document processing queue 422, and the coupling queue 423 or a storage time for storing a message in a queue at a predetermined time interval. The resource management unit 415 increases or decreases the number of instances assigned to the division processing unit 412, the document processing unit 413, or the coupling processing unit 414 in response to the monitoring result. In other words, the resource management unit 415 increases or decreases the number of processing units corresponding to a queue based on the number of jobs stored in the queue or the storage time for storing a job in the queue. More specifically, when the number of jobs stored in a queue is equal to or less than a predetermined threshold value (e.g., 0 or less), the resource management unit 415 decreases the number of processing units corresponding to the queue. Also, when the number of jobs stored in a queue exceeds the predetermined threshold value, the resource management unit 415 increases the number of processing units corresponding to the queue. The resource management unit 415 may determine whether or not a storage time for storing a job in a queue is equal to or greater than the predetermined threshold value, and determine whether or not the number of processing units corresponding to the queue is to be decreased or increased based on the determination result.

The division queue 421, the document processing queue 422, and the coupling queue 423 are implemented on the queue service 311 shown in FIG. 3. The division queue 421 is utilized for transferring processing from the reception processing unit 411 to the division processing unit 412. A message placed in a queue includes a request ID. The request ID is employed for retrieving information from the request table 441. The document processing queue 422 is utilized for transferring processing from the division processing unit 412 to the document processing unit 413. A message placed in a queue includes a request ID and a piece number. The request ID and the piece number are employed for retrieving information from the document processing table 442. The coupling queue 423 is employed for transmitting the fact that the division processing unit 412 has performed division processing to the coupling processing unit 414. By means of the transmission, the coupling processing unit 414 can confirm whether or not processing for pieces has been completed. A message placed in the coupling queue 423 includes a request ID. The request ID is employed for confirming the status to be described below.

The function of the processed data storage unit 431 is realized by the blob store 312 shown in FIG. 3. The processed data storage unit 431 stores document data received by the reception processing unit 411, data (piece) divided by the division processing unit 412, data (processed piece) processed by the document processing unit 413, and data coupled by the coupling processing unit 414. The request table 441 is implemented on the table store 313 shown in FIG. 3. The request table 441 holds information about a document processing request received by the reception processing unit 411. The document processing table 442 is implemented on the table store 313. The document processing table 442 holds information indicating the division processing status of document data performed by the division processing unit 412.

FIGS. 5A and 5B are diagrams illustrating examples of a request table and a document processing table, respectively. FIG. 5A is a diagram illustrating an example of the request table 441. The request table 441 has data items such as a request ID, a document data URI (Uniform Resource Identifier), a status, and the number of pieces. The request ID is an identifier for uniquely identifying a document processing request received by the reception processing unit 411. The reception processing unit 411 issues a request ID. The document data URI indicates a storage location, at which document data included in a document processing request received by the reception processing unit 411 is stored, on the processed data storage unit 431. The status indicates the processing state of the document processing request on a document processing system. The initial status value is "prior to division", and the status value is updated to the state of "divided" by the division processing unit 412 when the division processing unit 412 has completed division processing. When the coupling processing unit 414 has completed combining the processing results of the divided data, the status value is updated to "completed". The number of pieces indicates the number of document data divided by the division processing unit 412. The value of the number of pieces is written by the division processing unit 412 when the division processing unit 412 performs division processing.

FIG. 5B is a diagram illustrating an example of the document processing table 442. The document processing table 442 includes items such as a request ID, a piece number, a piece URI, and a status. The request ID is the parent and child relationship with the item of the same name in the request table 441, and indicates a request to be subjected to division processing. The piece number is a natural number that the division processing unit 412 assigns to a piece in sequence. Each of the records in the document processing table 442 is uniquely identified by the request ID and the piece number. The piece URI indicates a piece storage location on the processed data storage unit 431. The document processing unit 413 executes processing for a piece, and then overwrites data indicated by the piece URI to the processed piece for update. The status indicates whether or not processing for piece performed by the document processing unit 413 has been completed. The initial value of the status is "not completed". When processing performed by the document processing unit 413 has been completed, the status value is updated to "completed" by the document processing unit 413.

Figure 6:
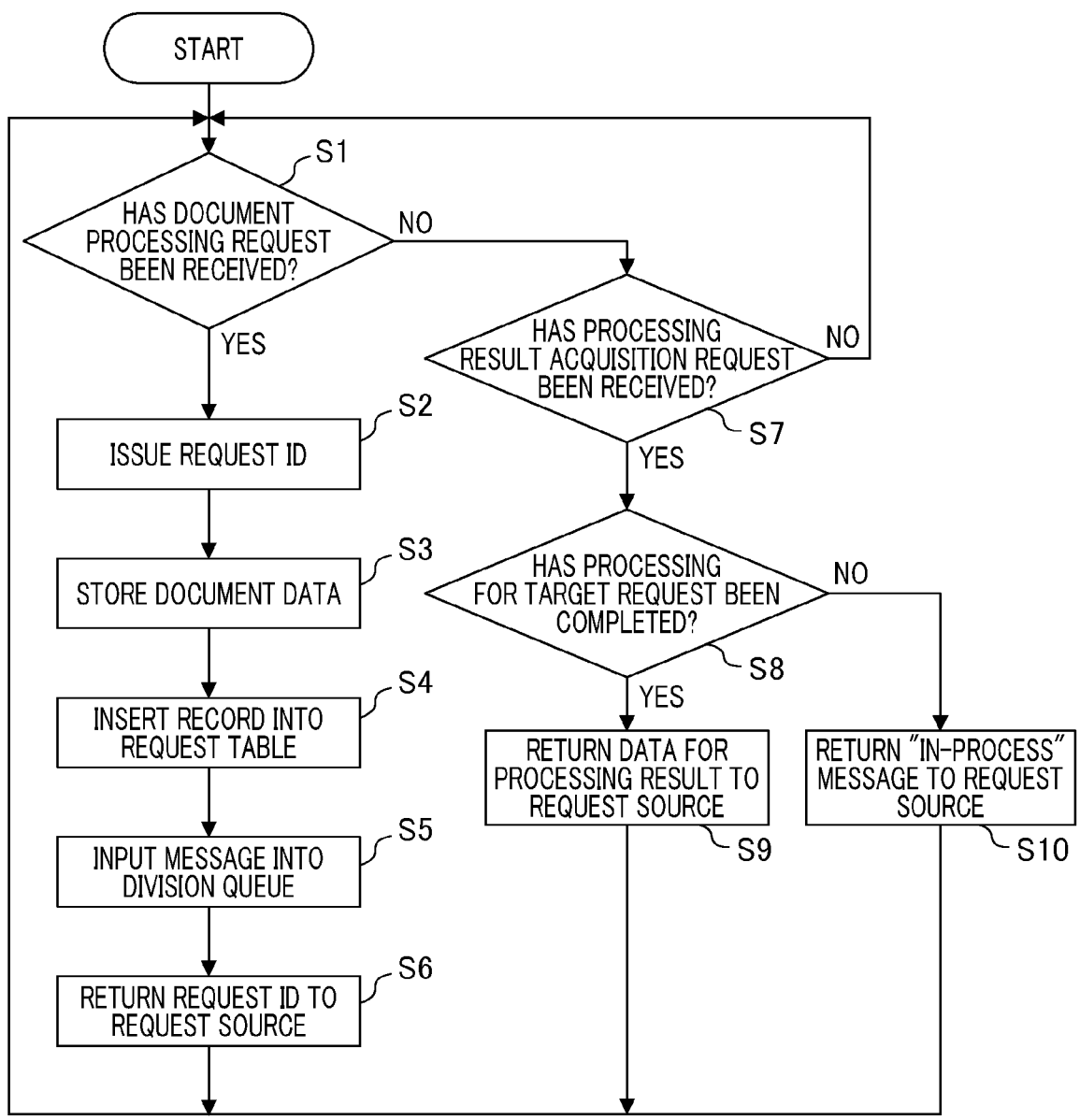
FIG. 6 is a flowchart illustrating operation processing performed by a reception processing unit.

FIG. 6 is a flowchart illustrating operation processing performed by the reception processing unit provided in document processing system of the first embodiment. The processes in the respective steps shown in the flowchart in FIG. 6 are realized by executing a control program by operating the Web Role instance 3011 by the CPU 211 for a server group provided in the document processing system 101.

First, the reception processing unit 411 determines whether or not a document processing request has been received (step S1). When the reception processing unit 411 determines that the document processing request has been received, the process advances to step S2. On the other hand, when the reception processing unit 411 determines that the document processing request has not been received, the process advances to step S7.

Next, the reception processing unit 411 issues a request ID for uniquely identifying the received request (step S2). Then, the reception processing unit 411 stores document data to be processed, which is included in the document processing request, in the processed data storage unit 431 (step S3). A URI (document data URI) to be specified upon storage is associated with a request ID. Next, the reception processing unit 411 inserts a record (one-line data) into the request table 441 (step S4). Among the items of the record, the value of the request ID is the request ID that has been issued in step S2. The value of the document data URI is an URI that has been associated with the request ID in step S3. The value of the status is "prior to division". The number of pieces is null at this point.

Next, the reception processing unit 411 inputs a message into the division queue 421 in order to transfer processing to the division processing unit 412 (step S5). A request ID is included in the message such that the division processing unit 412 can access the information required for processing. Next, the reception processing unit 411 returns the issued request ID to the transmission source of the document processing request (step S6), and then the process returns to step S1. The transmission source of the document processing request employs the returned request ID, and thus, can transmit a request for acquiring the processing result (processing result acquisition request) to the document processing system 101.

It is determined in step S7 whether or not the reception processing unit 411 has received a processing result acquisition request (step S7). When it is determined that the reception processing unit 411 has not received a processing result acquisition request, the process returns to step S1. On the other hand, when it is determined that the reception processing unit 411 has received a processing result acquisition request, the reception processing unit 411 extracts a request ID included in the processing result acquisition request. Then, the reception processing unit 411 confirms the status of the record corresponding to the request ID for the request table 441, and determines whether or not processing for the target request has been completed (step S8). When the status is "completed", the reception processing unit 411 determines that processing for the target request has completed, and the process advances to step S9. When the status is not "completed", the reception processing unit 411 determines that processing for the target request has not been completed, and the process advances to step S10.

Next, the reception processing unit 411 retrieves data for the processing result from the processed data storage unit 431 based on the document data URI included in the record corresponding to the request ID for the request table 441. Then, the reception processing unit 411 returns data for the processing result to the request source of the processing result acquisition request (step S9), and the process returns to step S1. In step S10, the reception processing unit 411 returns an "in-process" message to the request source of the processing result acquisition request (step S10), and the process returns to step S1.

Figure 7:
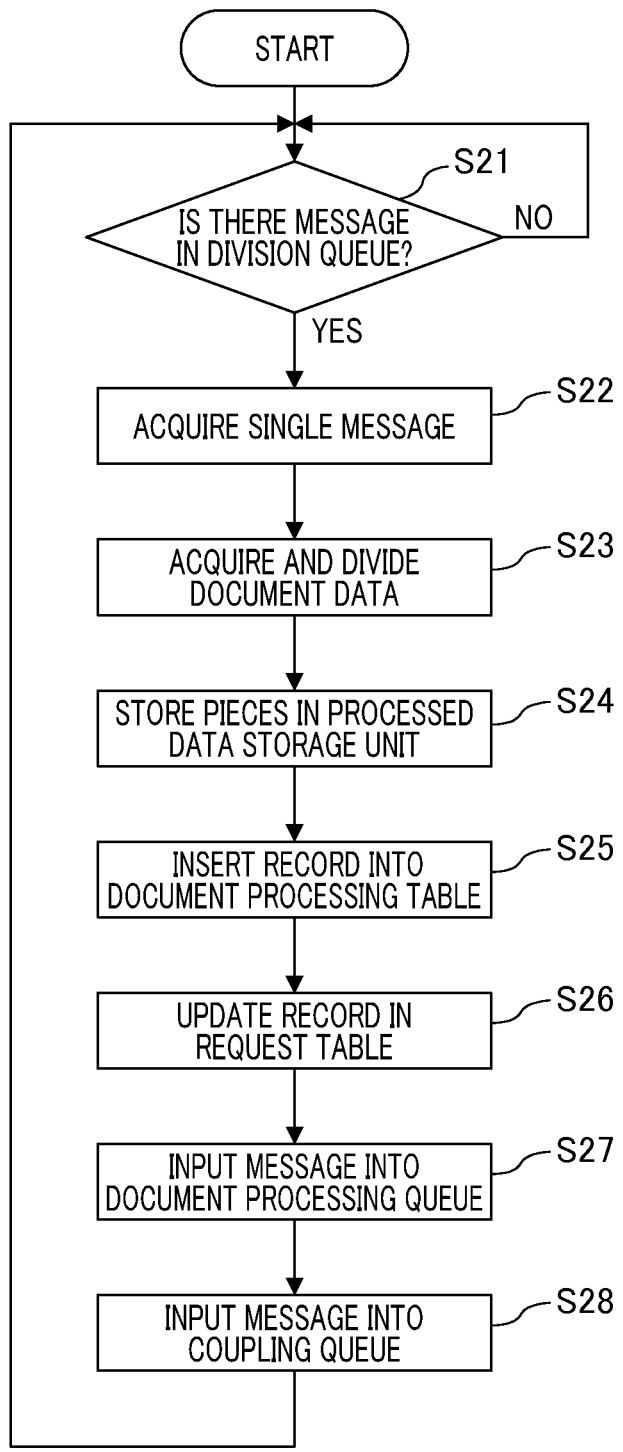
FIG. 7 is a flowchart illustrating operation processing performed by a division processing unit.

FIG. 7 is a flowchart illustrating operation processing performed by a division processing unit provided in the document processing system of the present embodiment. The processes in the respective steps shown in the flowchart in FIG. 7 are realized by executing a control program by operating the Worker Role instance 3021 by the CPU 211 for a server group provided in the document processing system 101.

First, the division processing unit 412 determines whether or not there is a message in the division queue 421 (step S21). When the division processing unit 412 determines that there is no message in the division queue 421, the process returns to step S21. On the other hand, when the division processing unit 412 determines that there is a message in the division queue 421, the division processing unit 412 acquires a single message from the division queue 421 (step S22). Then, the division processing unit 412 extracts the request ID included in the message as the request ID that corresponds to the request to be processed.

Next, the division processing unit 412 acquires information that includes document data and is required for division processing from the request table 441 and the processed data storage unit 431 based on the extracted request ID. Then, document data is divided into pieces based on the acquired information (step S23). In the present embodiment, the division processing unit 412 is intended to divide document data into a predetermined data unit (e.g., for each page).

Next, the division processing unit 412 stores the pieces in the processed data storage unit 431 (step S24). In step S24, the division processing unit 412 assigns a number (piece number) (numbered sequentially from 1) to each piece. Then, the division processing unit 412 generates a unique URI (piece URI) that identifies a piece by combining, for example, the request ID and the piece number, and specifies the generated URI as the storage location for each piece.

Next, the division processing unit 412 inserts a record into the document processing table 442 (step S25). Among the data items of the record, the value of the request ID is the request ID that has been extracted in step S22. The piece number is the number that has been assigned to the piece in step S24. The value of the piece URI is the URI that has been generated in step S24. The value of the status is "not completed".

Next, the division processing unit 412 updates a record having the request ID corresponding to the request to be processed in the request table 441. More specifically, the status of the record is changed to "divided", and the number of pieces into which document data is divided is written in the number of pieces. Next, in order to transfer processing to the document processing unit 413, the division processing unit 412 inputs messages, which correspond to the pieces and are the number of which is same as that of the pieces, into the document processing queue 422 (step S27). The division processing unit 412 puts a request ID and a piece number into the message such that the document processing unit 413 can access the information required for processing.

Next, the division processing unit 412 inputs the message into the coupling queue 423 in order to transfer processing to the coupling processing unit 414 (step S28). The division processing unit 412 puts a request ID into the message such that the coupling processing unit 414 can access the information required for processing. Then, the process returns to step S21.

Figure 8:
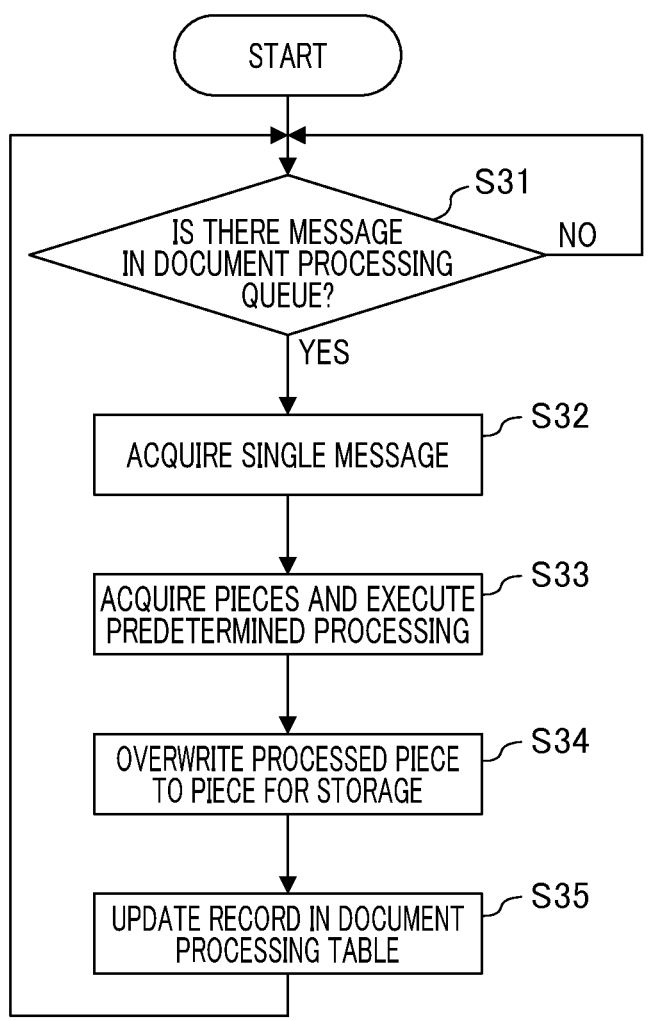
FIG. 8 is a flowchart illustrating operation processing performed by a document processing unit.

FIG. 8 is a flowchart illustrating operation processing performed by a document processing unit provided in the document processing system of the present embodiment. The processes in the respective steps shown in the flowchart in FIG. 8 are realized by executing a control program by operating the Worker Role instance 3021 by the CPU 211 for a server group provided in the document processing system 101.

First, the document processing unit 413 determines whether or not there is a message in the document processing queue 422 (step S31). When the document processing unit 413 determines that there is no message in the document processing queue 422, the process returns to step S31. On the other hand, when the document processing unit 413 determines that there is a message in the document processing queue 422, the document processing unit 413 acquires a single message from the document processing queue 422 (step S32), and extracts the request ID and the piece number included in the message.

Next, the document processing unit 413 acquires information, which includes the piece and is required for processing, from the document processing table 442 and the processed data storage unit 431 based on the request ID and the piece number that have been extracted. Then, predetermined processing is executed on the piece based on the acquired information (step S33). Next, the document processing unit 413 overwrites and stores data for the processing result (processed piece) to the piece URI in which data prior to processing has been stored (step S34). Then, the document processing unit 413 updates the record, which corresponds to the processed piece, in the document processing table 442 (step S35). More specifically, the status of the record is changed to "completed". Then, the process returns to step S31.

Figure 9:
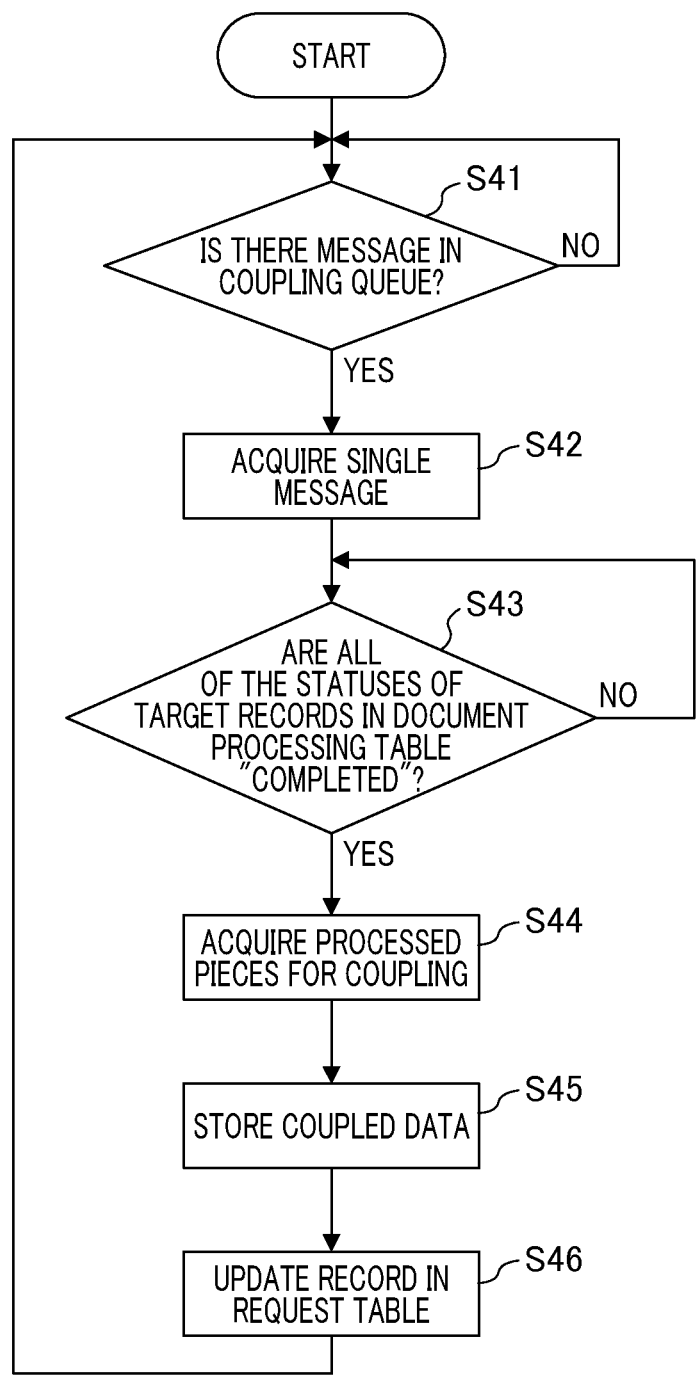
FIG. 9 is a flowchart illustrating operation processing performed by a coupling processing unit.

FIG. 9 is a flowchart illustrating operation processing performed by a coupling processing unit provided in the document processing system of the present embodiment. The processes in the respective steps shown in the flowchart in FIG. 9 are realized by executing a control program by operating the Worker Role instance 3021 by the CPU 211 for a server group provided in the document processing system 101.

First, the coupling processing unit 414 determines whether or not there is a message in the coupling queue 423 (step S41). When the coupling processing unit 414 determines that there is no message in the coupling queue 423, the process returns to step S41. On the other hand, when the coupling processing unit 414 determines that there is a message in the coupling queue 423, the coupling processing unit 414 acquires a single message from the coupling queue 423 (step S42), and extracts the request ID included in the message.

Next, the coupling processing unit 414 determines whether or not the statuses of all of the records (target records) having the request ID are "completed" in the document processing table 442 based on the extracted request ID (step S43). When the coupling processing unit 414 determines that there are any records of which the statuses are not "completed" among the target records, the process returns to step S43. On the other hand, when the coupling processing unit 414 determines that the statuses of the target records are "completed", the coupling processing unit 414 performs the following processing. The coupling processing unit 414 extracts the piece number corresponding to the request ID extracted in step S42 from the document processing table 442. The coupling processing unit 414 acquires the piece (processed piece) corresponding to the extracted piece number from the processed data storage unit 431, and combines the pieces in the order of the piece numbers (step S44).

Next, the coupling processing unit 414 overwrites and stores the coupled data to the document data URI, which corresponds to the request ID, in the request table 441 (step S45). Then, the coupling processing unit 414 updates the status, which is included in the record corresponding to the request ID, to "completed" in the request table 441 (step S46), and the process returns to step S41.

Figure 10:
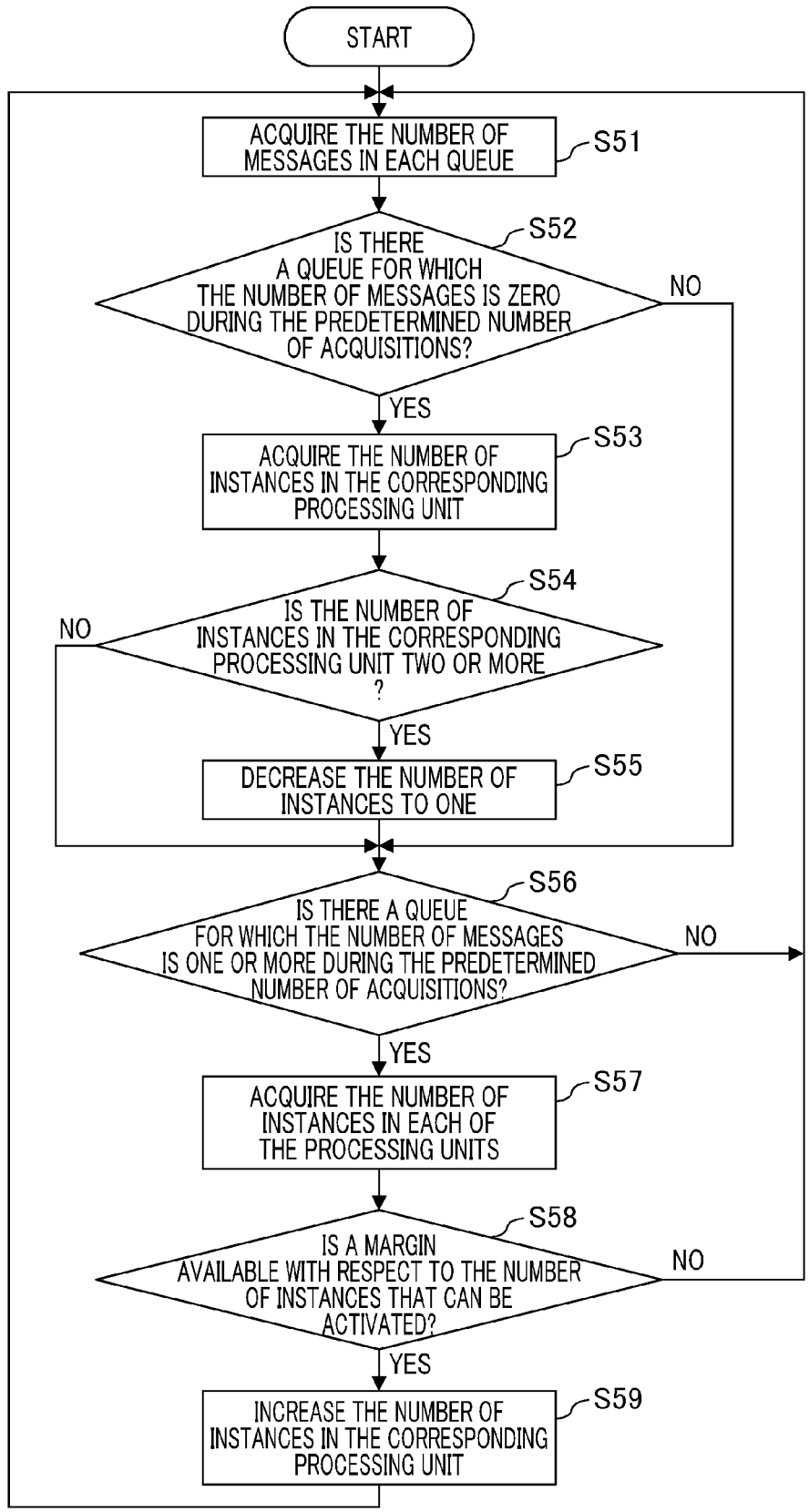
FIG. 10 is a flowchart illustrating operation processing performed by a resource management unit.

FIG. 10 is a flowchart illustrating operation processing performed by a resource management unit provided in the document processing system of the present embodiment. The processes in the respective steps shown in the flowchart in FIG. 10 are realized by executing a control program by operating the Worker Role instance 3021 by the CPU 211 for a server group provided in the document processing system 101.

First, the resource management unit 415 waits for a predetermined monitoring interval time. After a lapse of a monitoring interval time, the resource management unit 415 acquires the number of unprocessed messages contained in each of the division queue 421, the document processing queue 422, and the coupling queue 423 (step S51). The resource management unit 415 stores the number of messages for the predetermined number of acquisitions for each queue. Next, the resource management unit 415 determines whether or not there is a queue for which the number of messages is zero during the predetermined number of acquisitions (step S52).

When there is no queue for which the number of messages is zero during the predetermined number of acquisitions, the process advances to step S56. On the other hand, when there is a queue for which the number of messages is zero during the predetermined number of acquisitions, the resource management unit 415 acquires the number of instances in the processing unit, which correspond to the queue for which the number of messages is zero during the predetermined number of acquisitions, from the fabric controller 303 (step S53). More specifically, the resource management unit 415 acquires the number of instances in the division processing unit 412 when the queue for which the number of messages is zero is the division queue 421. The resource management unit 415 acquires the number of instances in the document processing unit 413 when the queue for which the number of messages is zero is the document processing queue 422. Also, the resource management unit 415 acquires the number of instances in the coupling processing unit 414 when the queue for which the number of messages is zero is the coupling queue 423. In step S52, when there is a plurality of queues in which the number of messages is zero during the predetermined number of acquisitions, the resource management unit 415 acquires a plurality of the number of instances depending on the number of queues for which it has been determined that the number of messages is zero.

Next, the resource management unit 415 determines whether or not the number of instances acquired in step S53 is two or more (step S54). When the number of instances acquired in step S53 is less than two, the process advances to step S56. On the other hand, when the number of instances acquired in step S53 is two or more, the process advances to step S55. Next, the resource management unit 415 provides an instruction to the fabric controller 303 to decrease the number of instances in all of the processing units, in which the number of instances has been determined to be two or more, to one (step S55).

Next, the resource management unit 415 determines whether or not there is a queue for which the number of messages is one or more during the predetermined number of acquisitions (step S56). When there is no queue for which the number of messages is one or more during the predetermined number of acquisitions, the process returns to step S51. On the other hand, when there is a queue for which the number of messages is one or more during the predetermined number of acquisitions, the resource management unit 415 acquires the number of instances in each of the processing units from the fabric controller 303 (step S57).

Next, the resource management unit 415 determines whether or not a margin is available with respect to the number of instances that can be activated (step S58). More specifically, the resource management unit 415 determines whether or not the total number of instances in each of the processing units, which have been acquired in step S57, is less than the number of instances that can be activated by all of the processing units. When the total number of instances in each of the processing units is equal to or greater than the number of instances that can be activated by all of the processing units, the resource management unit 415 determines that a margin is unavailable with respect to the number of instances that can be activated, and the process returns to step S51. On the other hand, when the total number of instances in each of the processing units is less than the number of instances that can be activated by all of the processing units, the resource management unit 415 determines that a margin is available with respect to the number of instances that can be activated, and the process advances to step S59. Then, the resource management unit 415 provides an instruction to the fabric controller 303 to increase the number of instances in the processing unit, which corresponds to the queue which has determined in step S56 that the number of messages is one or more during the predetermined number of acquisitions, by one (step S59). Then, the process returns to step S51.

According to the document processing system of the present embodiment, the number of instances in each of the processing units may be increased or decreased in the predetermined range of the number of instances that can be activated within the document processing system depending on the delay state or the idle state of the processing units. With this arrangement, the instances may be distributed efficiently while avoiding the possibility that a high number of instances will be wastefully activated. Therefore, the document processing system of the present embodiment is particularly beneficial when the cloud environment for the charging system depending on the number of instances in a VM that is being activated is utilized.

While in the present embodiment, the processing of the resource management unit 415 is executed by the Worker Role instance 3021, the processing of the resource management unit 415 may also be executed by the Web Role instance 3011. In this case, the resource management unit 415 receives a monitoring request from a program supplied from the exterior of the platform system shown in FIG. 3 at a certain time interval, whereby the operation according to the flowchart shown in FIG. 10 may be realized. The function of the resource management unit 415 may be provided for the management VM 307 or the VM 301.

Also, the decreasing number of instances in step S55 in FIG. 10 or the increasing number of instances in step S59 in FIG. 10 may be variable depending on the number of instances that are being activated. Also, the time period or the time during which a message is stored in a queue may also be employed as the condition of increasing or decreasing the number of instances. Furthermore, for the timing at which each of the processing units inputs a message into a queue, the aforementioned timing may not be employed. For example, the division processing unit 412 may not input a message to the coupling queue 423 immediately after division, but may input a message to the coupling queue 423 upon completion of processing for the respective pieces (at the time point where the statuses of the respective pieces in the document processing table 442 have become "completed"). In this case, the coupling processing unit 414 starts a coupling process immediately after the message has been retrieved from the coupling queue 423.

For the content of the message to be input to each of the queues, more content from the request table 441 and the document processing table 442 may also be included. With this arrangement, table reference processing performed by the processing unit that has acquired a queue may be reduced. Also, each of the instances may execute the functions of a plurality of processing units. For example, the reception processing unit 411 may serve as the division processing unit 412. In this case, the division queue 421 may not be needed.

Also, the division processing unit 412 may not divide document data depending on the data amount of document data.

Also, setting information about processing may be provided in the request table 441. In that case, the document processing unit 413 accesses the request table 441 so as to refer to the information, and reflects the information in its own processing. When the coupling processing unit 414 overwrites and stores data in the processed data storage unit 431, the data may be stored under a different name in order to avoid data loss upon the occurrence of error. In that case, by having the item "result data URI" in the table, result data can be transferred.

Also, the processing unit may delete the record in the table. For example, for the record in the document processing table 442, the record associated with the coupled data may be deleted after the coupling processing unit 414 has completed coupling processing. Also, batch processing that is activated at regular intervals may be prepared such that a predetermined processing unit may delete the record having the request ID, of which the status is "completed" in the request table 441, during batch processing. With this arrangement, the cost of operation when utilizing the cloud environment for which the charge depends on the amount of data stored may be reduced.

Next, a description will be given of other embodiments. In the other embodiments, the only difference from the first embodiment is the operation of the division processing unit 412. Therefore, a description will be given below only with respect to the operation of the division processing unit 412. The division processing unit 412 provided in the document processing system determines a division size and a division number depending on the number of instances in the document processing unit 413 that is being activated and the remaining number of messages in a document processing queue.

Figure 11:
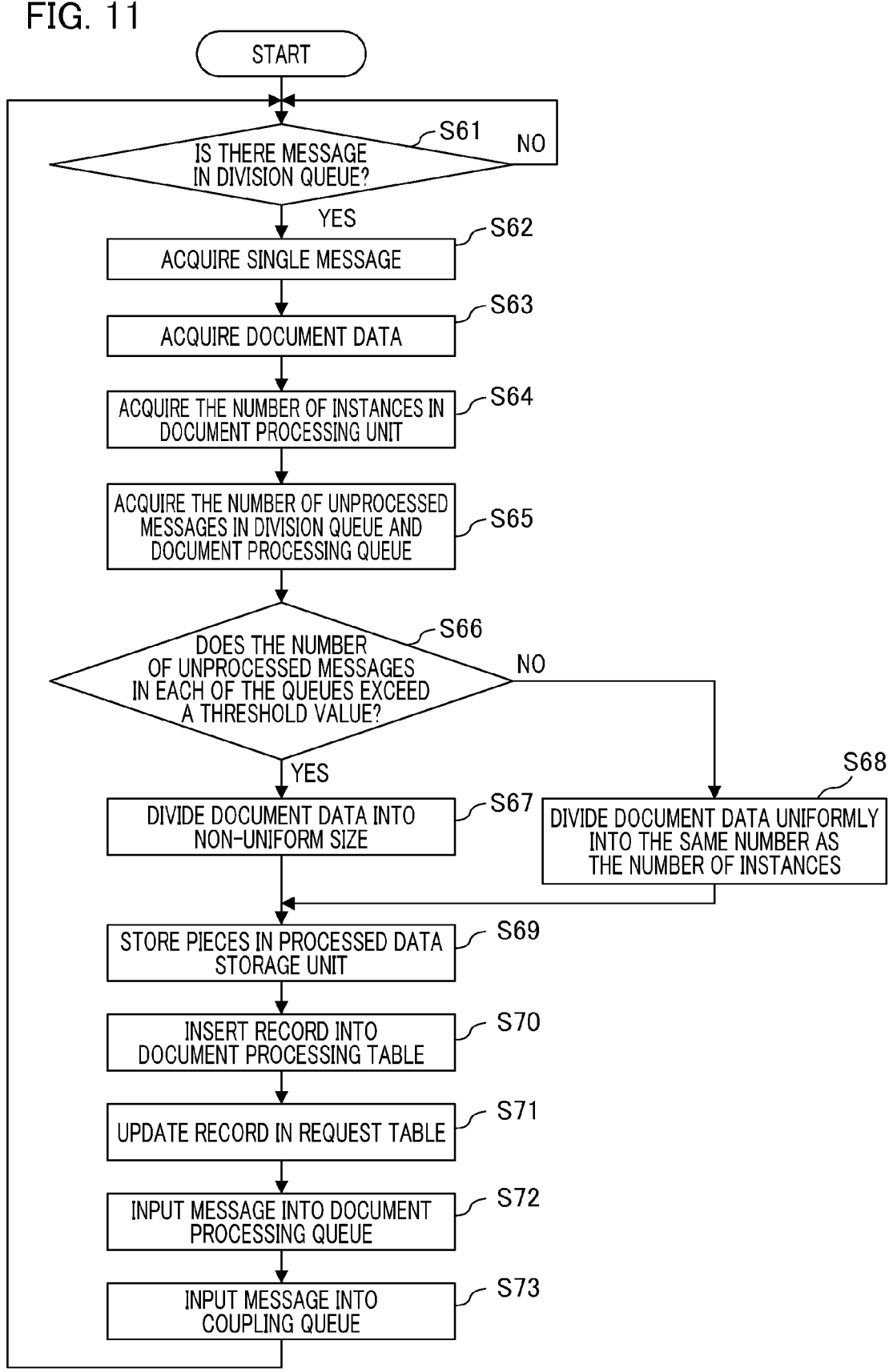
FIG. 11 is a flowchart illustrating operation processing performed by a division processing unit.

FIG. 11 is a flowchart illustrating operation processing performed by a division processing unit provided in the document processing system of the present embodiment. The steps S61 and S62 shown in FIG. 11 are the same as the steps S21 and S22 shown in FIG. 7. Also, the steps S69 to S73 shown in FIG. 11 are the same as the steps S24 to S28 shown in FIG. 7.

In the present embodiment, in step S63, the division processing unit 412 acquires information that includes document data and is required for division processing from the request table 441 and the processed data storage unit 431 (step S63). Next, the division processing unit 412 acquires the number of Worker Role instances that are being activated as the document processing unit 413 from the fabric controller 303 of the platform system shown in FIG. 3 (step S64). The division processing unit 412 acquires the number of unprocessed messages from the messages that have been input to the division queue 421 and the document processing queue 422 (step S65).

Next, the division processing unit 412 determines whether or not the number of messages in the queues that has been acquired in step S65 exceeds a threshold value (step S66). The threshold value may be a predetermined fixed value, or may be variable depending on the number of Worker Role instances, which have been acquired in step S64, in the document processing unit 413. When the number of messages in any one of the queues exceeds a threshold value, the process advances to step S67. When the number of messages in the queues does not exceed a threshold value, the process advances to step S68.

In step S67, the division processing unit 412 divides document data into a non-uniform size (step S67), and the process advances to step S69. More specifically, the division processing unit 412 divides document data into pieces such that the number of pieces does not exceed the number of Worker Role instances, which has been acquired in step S64, in the document processing unit 413. The division processing unit 412 divides document data into pieces such that the sizes of the pieces are differentiated (the data amount of one piece is smaller than that of another piece) so as to carry out processing performed by the document processing unit 413 in a short period of time. The division processing unit 412 may divide document data into the number smaller than the number of instances in the document processing unit 413. In step S68, the division processing unit 412 uniformly divides document data into the same number as the number of Worker Role instances in the document processing unit 413 acquired in step S64 (step S68), and the process advances to step S69.

The document processing system of the present embodiment makes the data size of pieces uneven depending on the state of the queue (i.e., the delay state of processing), whereby an instance, which may quickly finish processing for a certain request, may be generated. With this arrangement, a plurality of requests may be brought quickly into the start state of document processing. Therefore, the delay of processing for a request, in which the size of document data is small so that processing can be finished in a short period of time, can be particularly reduced.

A description will be given of a next embodiment. The present embodiment is a variation of the first embodiment. Hence, the following description will be focused on the difference from the first embodiment.

Figures 12A, 12B:
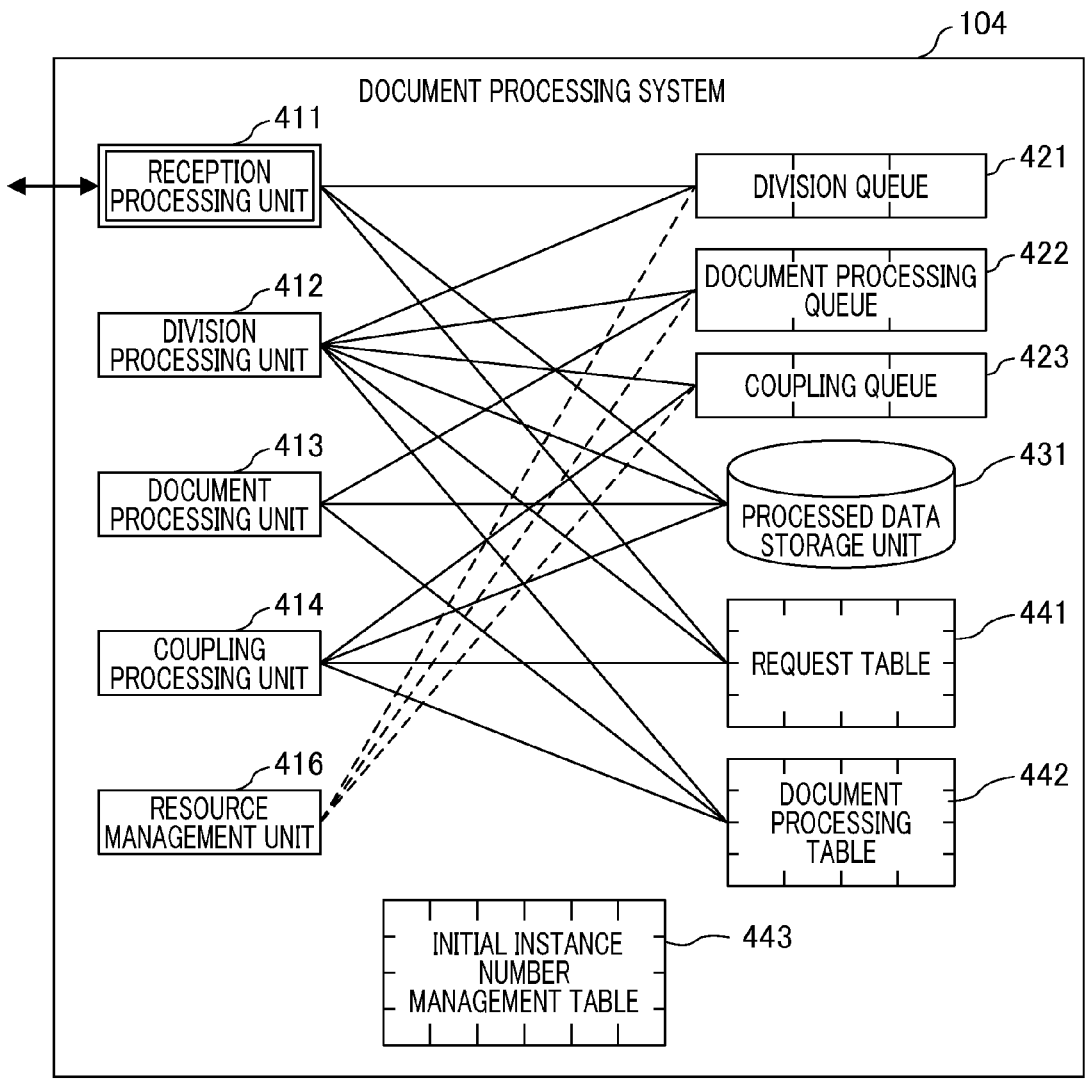
FIG. 12A is a functional block diagram illustrating an example of a document processing system.
FIG. 12B is a diagram illustrating an example of an initial instance number management table.

FIGS. 12A and 12B are diagrams illustrating examples of a functional block of the document processing system of the present embodiment and an initial instance number management table, respectively. FIG. 12A is a functional block diagram illustrating an example of a document processing system. A document processing system 104 shown in FIG. 12A includes a resource management unit 416 instead of the resource management unit 415 provided in the document processing system 101 shown in FIG. 4. Also, the document processing system 104 includes an initial instance number management table 443. The initial instance number management table 443 includes the type of VM (either Web Role or Worker Role) in each of the processing units, and information about the number of initial instances. The number of initial instances is the number of instances to be activated immediately after the start of the document processing system 104.

FIG. 12B is a diagram illustrating an example of the initial instance number management table 443. The initial instance number management table 443 includes data items such as a processing unit, the type of VM, and the number of initial instances. The processing unit is a processing unit provided in the document processing system 104. The type of VM is the type of VM assigned to the processing unit. The number of initial instances is the number of initial instances that correspond to the processing unit. The instance in each of the processing units confirms whether or not there is a record for its own processing unit when the instance is activated, and when there is no record, generates a record for its own processing unit. The number of initial instances is described in a setting file located in each of the processing units. The instance of each of the processing units is intended to read and hold the setting information upon activation of the instance.

Figure 13:
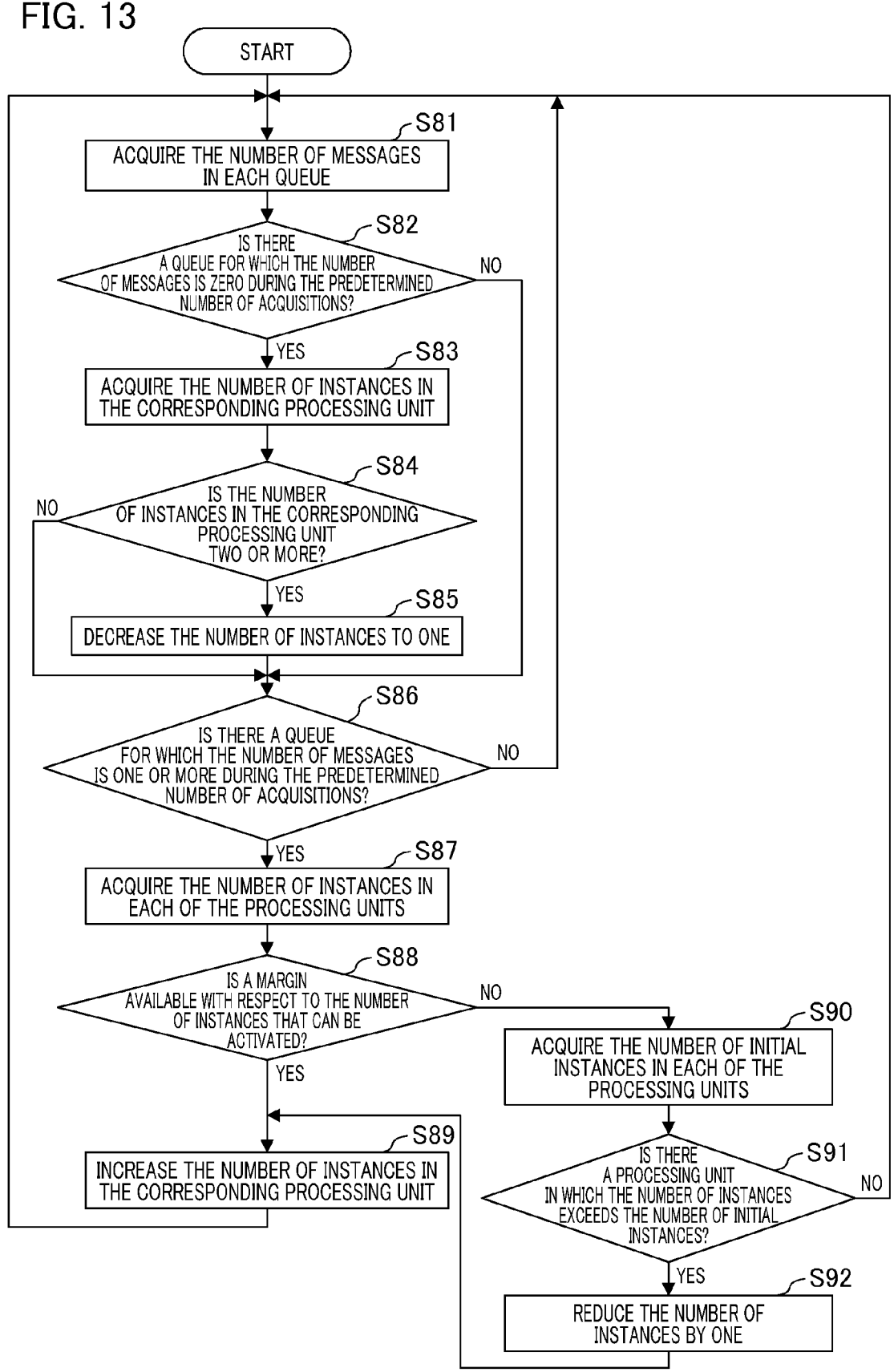
FIG. 13 is a flowchart illustrating operation processing performed by a resource management unit.

FIG. 13 is a flowchart illustrating operation processing performed by a resource management unit provided in the document processing system of the present embodiment. The steps S81 to S89 shown in FIG. 13 are the same as the steps S51 to S59 shown in FIG. 10. In the present embodiment, when the resource management unit 416 determines that a margin is unavailable with respect to the number of instances that can be activated as a result of determination processing in step S88, the resource management unit 416 performs the following processing. The resource management unit 416 acquires the number of initial instances in each of the processing units from the initial instance number management table 443 (step S90). The resource management unit 416 compares the number of instances in each of the processing units acquired in step S87 with the number of initial instances in each of the processing units acquired in step S90, and performs the following processing. The resource management unit 416 determines whether or not there is a processing unit in which the number of the corresponding instances exceeds the number of initial instances (step S91).

When there is no processing unit in which the number of the corresponding instances exceeds the number of initial instances, the process returns to step S81. On the other hand, when there is a processing unit in which the number of the corresponding instances exceeds the number of initial instances, the process advances to step S92. Then, the resource management unit 416 provides an instruction to the fabric controller 303 to reduce the number of instances in the processing unit, for which it has been determined that the number of the corresponding instances exceeds the number of initial instances, by one (step S92), and the process advances to step S89. Note that the reduction in the number of instances in step S92 may be plural or may be variable depending on the number of instances that are being activated.

According to the document processing system 104 of the present embodiment, the number of instances in a processing unit in which the number of instances that are being activated exceeds the number of initial instances can be decreased in the state where a margin is unavailable with respect to the number of instances that can be activated, whereby the instance in a processing unit with its processing delayed can be activated. With this arrangement, the instances can be prevented from being disproportionately distributed to a specific processing unit.

A description will be given of a next embodiment. The document processing system of the present embodiment has a similar configuration to that of the document processing system shown in FIG. 12A. In the document processing system of the present embodiment, the operation of the resource management unit and the data configuration of the initial instance number management table 443 are different from those of the document processing system 104 shown in FIG. 12A. In the present embodiment, it is assumed that there are two types of VMs: a low performance VM and a high performance VM that are different depending on the performance of a VM.

FIG. 14 is a diagram illustrating an example of an initial instance number management table according to the present embodiment. The initial instance number management table 443 shown in FIG. 14 includes a data item called "performance" in addition to the data items included in the initial instance number management table 443 shown in FIG. 12B. The performance indicates whether the VM performance is either a low performance or a high performance.

Figure 15A:
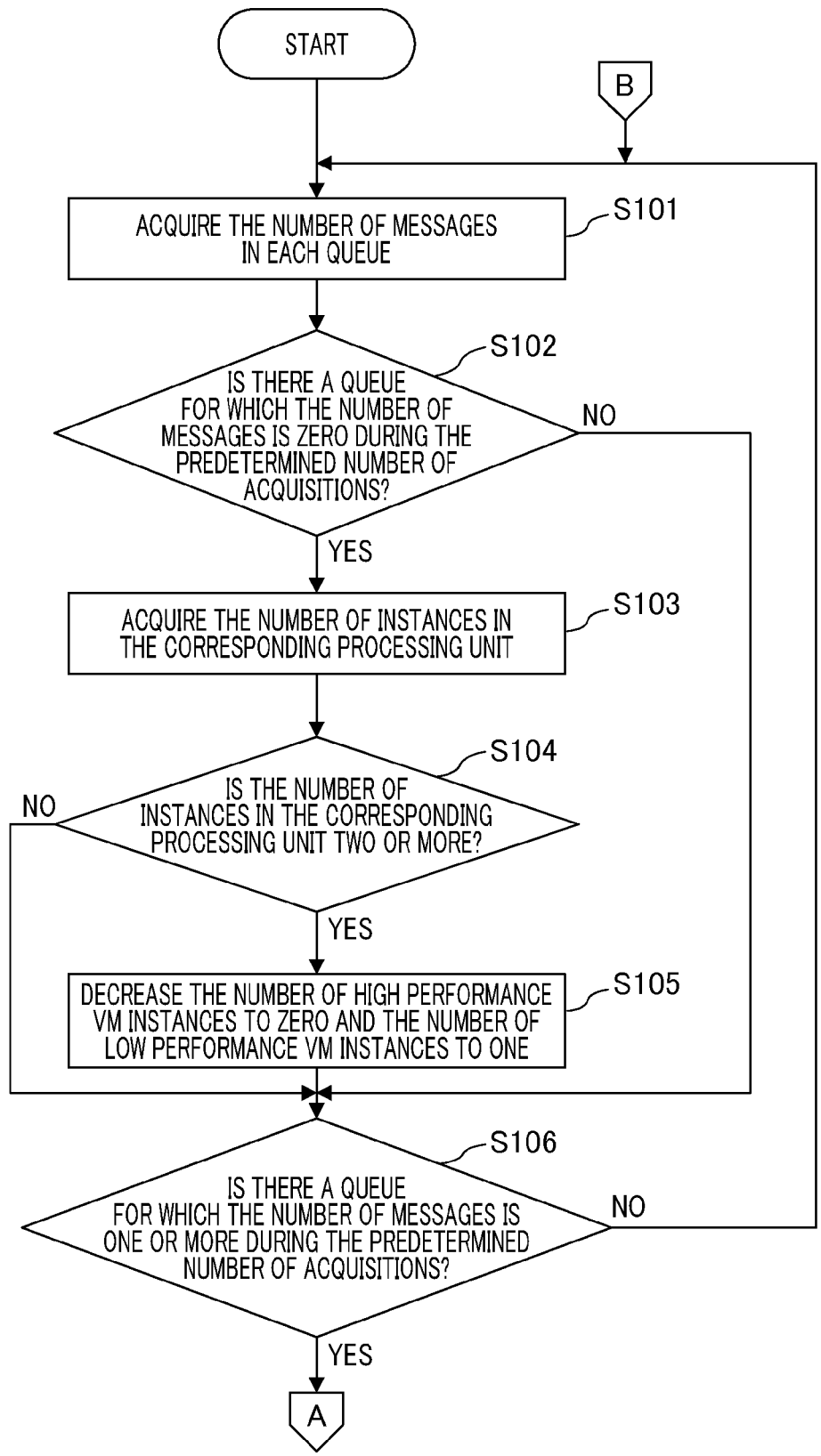
FIGS. 15A and 15B show a flowchart illustrating operation processing performed by a resource management unit.
Figure 15B:
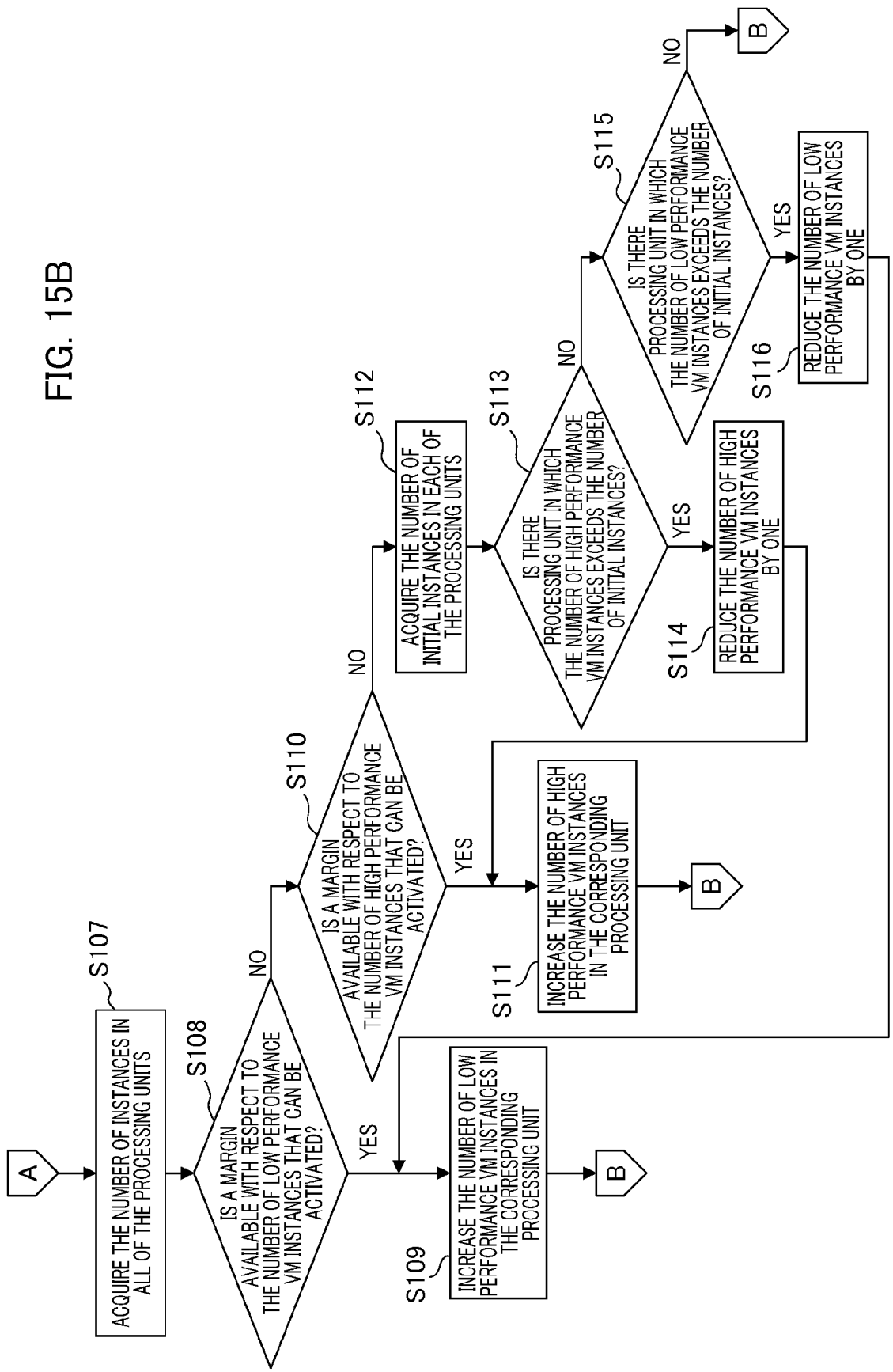

FIGS. 15A and 15B show a flowchart illustrating operation processing performed by a resource management unit provided in the document processing system of the present embodiment. The steps S101 to S104 shown in FIG. 15A are the same as the steps S81 to S84 shown in FIG. 13. In the present embodiment, the resource management unit 416 provides an instruction to the fabric controller 303 to reduce the number of instances in all of the processing units for which the number of instances has been determined to be two or more (see step S104). In the present embodiment, the resource management unit 416 provides an instruction to the fabric controller 303 to decrease the number of high performance VM instances to zero, and the number of low performance VM instances to one (step S105).

Next, the resource management unit 416 determines whether or not there is a queue for which the number of messages is one or more during the predetermined number of acquisitions (step S106). When there is no queue for which the number of messages is one or more during the predetermined number of acquisitions, the process returns to step S101. When there is a queue for which the number of messages is one or more during the predetermined number of acquisitions, the process advances to step S107 in FIG. 15B. Next, the resource management unit 416 acquires the number of low performance VM instances and the number of high performance VM instances in all of the processing units from the fabric controller 303 (step S107).

Next, the resource management unit 416 determines whether or not a margin is available with respect to the number of low performance VM instances that can be activated (step S108). More specifically, the resource management unit 416 determines whether or not the total number of low performance VM instances in each of the processing units, which has been acquired in step S107, is less than the number of low performance VM instances that can be activated by all of the processing units. When the total number of low performance VM instances in each of the processing units is less than the number of low performance VM instances that can be activated by all of the processing units, the resource management unit 416 determines that a margin is available with respect to the number of low performance VM instances that can be activated, and the process advances to step S109. On the other hand, when the total number of low performance VM instances in each of the processing units is equal to or greater than the number of low performance VM instances that can be activated by all of the processing units, the resource management unit 416 determines that a margin is unavailable with respect to the number of low performance VM instances that can be activated, and the process advances to step S110.

In step S109, the resource management unit 416 provides an instruction to the fabric controller 303 as follows. The resource management unit 416 provides an instruction to the fabric controller 303 to increase the number of low performance VM instances in the processing unit, which corresponds to the queue (see step S106 in FIG. 15A) for which it has been determined that the number of messages is one or more during the predetermined number of acquisitions, by one. Then, the process returns to step S101 in FIG. 15A.

In step S110, the resource management unit 416 determines whether or not a margin is available with respect to the number of high performance VM instances that can be activated (step S110). More specifically, the resource management unit 416 determines whether or not the total number of high performance VM instances in each of the processing units, which has been acquired in step S107, is less than the number of high performance VM instances that can be activated by all of the processing units. When the total number of high performance VM instances in each of the processing units is less than the number of high performance VM instances that can be activated by all of the processing units, the resource management unit 416 determines that a margin is available with respect to the number of high performance VM instances that can be activated, and the process advances to step S111. On the other hand, when the total number of high performance VM instances in each of the processing units is equal to or greater than the number of high performance VM instances that can be activated by all of the processing units, the resource management unit 416 determines that a margin is unavailable with respect to the number of high performance VM instances that can be activated, the process advances to step S112.

In step S111, the resource management unit 416 provides an instruction to the fabric controller 303 as follows. The resource management unit 416 provides an instruction to the fabric controller 303 to increase the number of high performance VM instances in the processing unit, which corresponds to the queue for which it has been determined that the number of messages is one or more during the predetermined number of acquisitions (see step S106 in FIG. 15A), by one. Then, the process returns to step S101 in FIG. 15A.

In step S112, the resource management unit 416 acquires the number of low performance VM initial instances and the number of high performance VM initial instances in each of the processing units from the initial instance number management table 443 (step S112). Next, the resource management unit 416 compares the number of high performance VM instances in each of the processing units acquired in step S107 with the number of high performance VM initial instances in each of the processing units acquired in step S112. Then, the resource management unit 416 determines whether or not there is a processing unit in which the number of the corresponding high performance VM instances exceeds the number of high performance VM initial instances (step S113). When there is a processing unit in which the number of the corresponding high performance VM instances exceeds the number of high performance VM initial instances, the process advances to step S114. On the other hand, when there is no processing unit in which the number of the corresponding high performance VM instances exceeds the number of high performance VM initial instances, the process advances to step S115. In step S114, the resource management unit 416 provides an instruction to the fabric controller 303 as follows. The resource management unit 416 provides an instruction to the fabric controller 303 to reduce the number of high performance VM instances in the processing unit (see step S113), for which it has been determined that the number of the corresponding high performance VM instances exceeds the number of initial instances, by one. Then, the process advances to step S111.

In step S115, the resource management unit 416 compares the number of low performance VM instances in each of the processing units acquired in step S107 with the number of low performance VM initial instances in each of the processing units acquired in step S112. Then, the resource management unit 416 determines whether or not there is a processing unit in which the number of the corresponding low performance VM instances exceeds the number of low performance VM initial instances (step S115). When there is no processing unit in which the number of the corresponding low performance VM instances exceeds the number of low performance VM initial instances, the process returns to step S101 in FIG. 15A. On the other hand, when there is a processing unit in which the number of the corresponding low performance VM instances exceeds the number of low performance VM initial instances, the process advances to step S116. Then, the resource management unit 416 provides an instruction to the fabric controller 303 to reduce the number of low performance VM instances in the processing unit (see step S115), for which it has been determined that the number of the corresponding low performance VM instances exceeds the number of initial instances, by one. Then, the process advances to step S109.

In the document processing system of the present embodiment, the activation of a low performance VM is prioritized when a margin is available with respect to the number of instances that can be activated. This is because the present invention takes into consideration the fact that a low performance VM may normally be activated at low cost. However, when processing speed is important, the document processing system may prioritize the activation of a high performance VM. Also, the document processing system may determine whether a low performance VM or a high performance VM is activated depending on the number of messages in a queue. Also, while in the present embodiment, a description has been given by taking as an example of the case where there are two types of VM performance, the types of a VM may be two or more. According to the document processing system of the present embodiment, the number of VM instances may be increased or decreased based on the determination result indicating whether or not a margin is available with respect to the number of low performance VM instances and the number of high performance VM instances that can be activated.

A description will be given of a next embodiment. In the present embodiment, a high performance VM operates only on the document processing unit 413. Also, a low performance VM operates on all of the processing units. In other words, the document processing unit 413 includes a first document processing back-end processing unit (low performance VM) having first processing performance, and a second document processing back-end processing unit (high performance VM) having second processing performance of which the processing performance is higher than the first processing performance. In the present embodiment, the division processing unit 412 performs division processing while taking the VM performance into consideration.

Figures 16A, 16B:
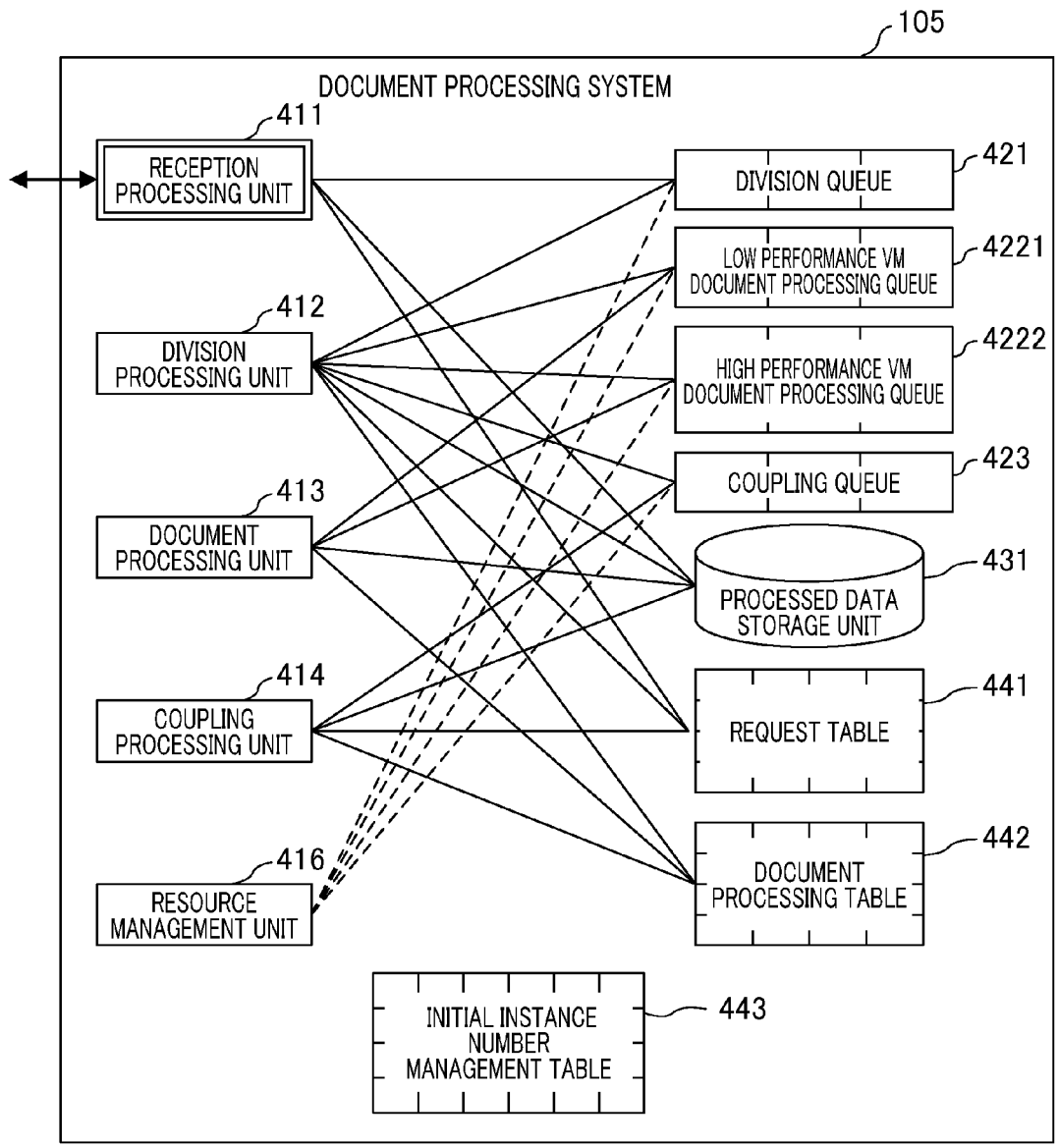
FIG. 16A is a functional block diagram illustrating an example of a document processing system.
FIG. 16B is a diagram illustrating an example of an initial instance number management table.

FIGS. 16A and 16B are respectively a functional block diagram illustrating an example of the document processing system of the present embodiment and a diagram illustrating an example of an initial instance number management table. FIG. 16A is a functional block diagram illustrating an example of the document processing system 105 of the present embodiment. The document processing system 105 includes a low performance VM document processing queue 4221 and a high performance VM document processing queue 4222 instead of the document processing queue 422 provided in the document processing system 104 shown in FIG. 12A. The low performance VM document processing queue 4221 is a queue that corresponds to the low performance VM instance that is being operated as the document processing unit 413. The low performance VM document processing queue 4221 stores a message including information about a piece to be processed by the low performance VM instance. The high performance VM document processing queue 4222 is a queue that corresponds to the high performance VM instance that is being operated as the document processing unit 413. The high performance VM document processing queue 4222 stores a message including information about a piece to be processed by the high performance VM instance.

FIG. 16B is a diagram illustrating an example of the initial instance number management table 443 provided in the document processing system 105. In the initial instance number management table 443, a high performance VM record is present only on a record (one-line data) that corresponds to the document processing unit 413.

Figure 17A:
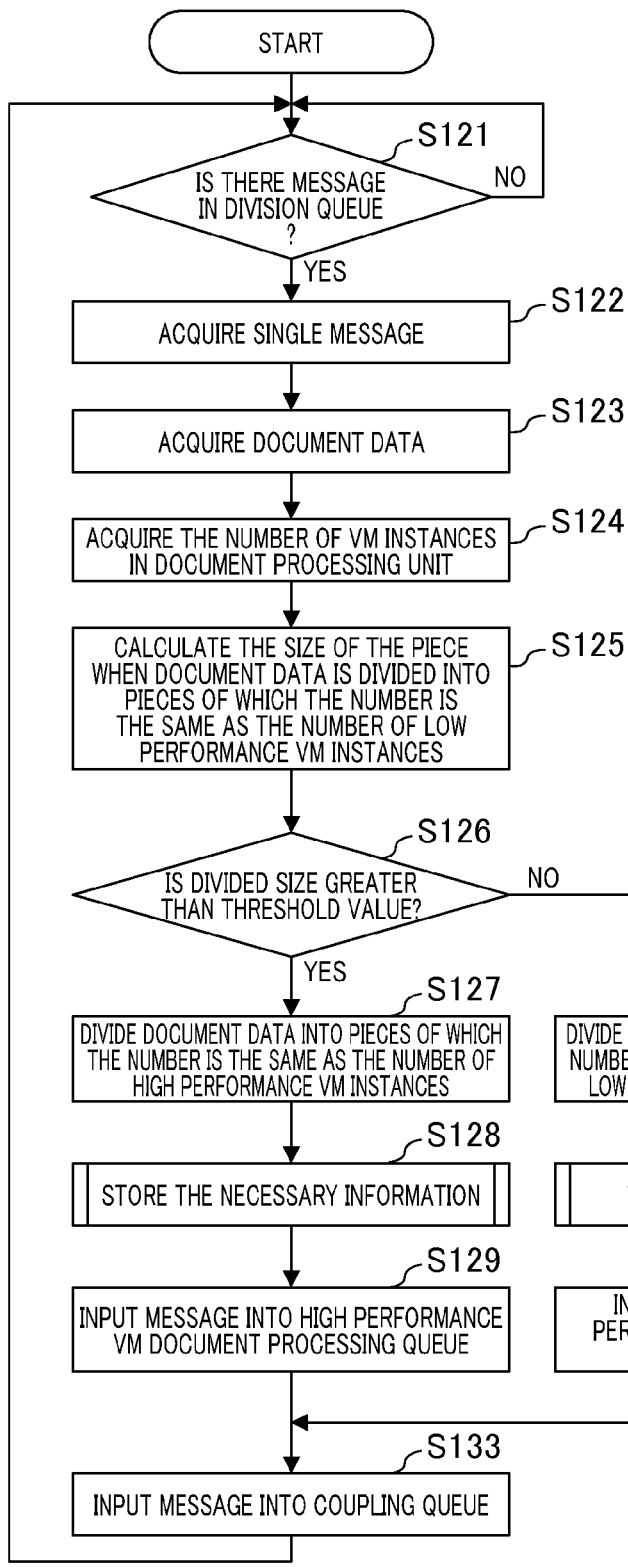
FIGS. 17A and 17B show a flowchart illustrating operation processing performed by a division processing unit.
Figure 17B:
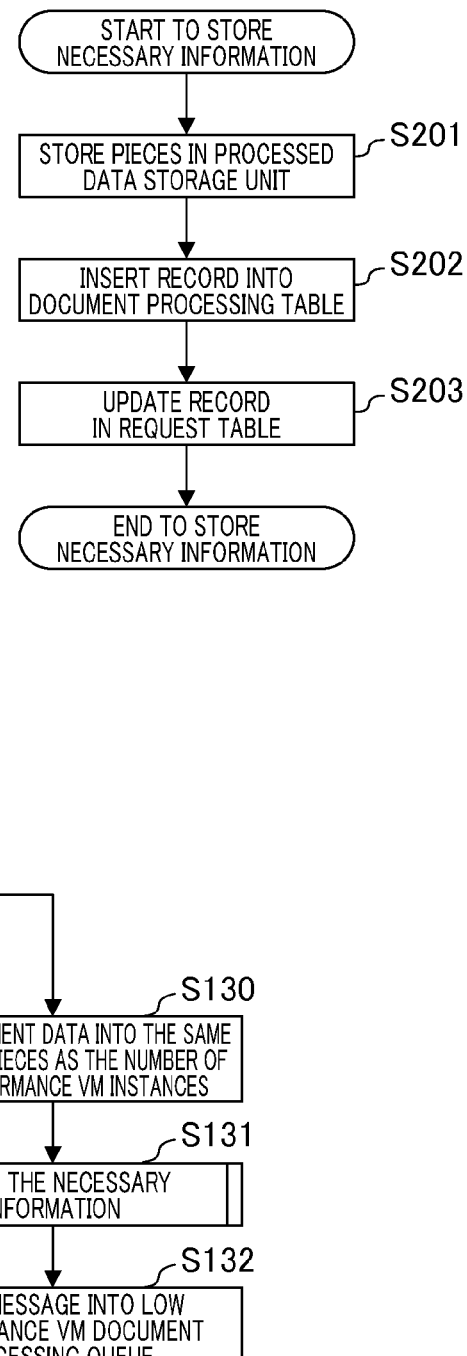

FIGS. 17A and 17B are flowcharts illustrating operation processing performed by a division processing unit provided in the document processing system of the present embodiment. The steps S121 to S123 shown in FIG. 17A are the same as the steps S61 to S63 shown in FIG. 11. In the present embodiment, in step S124 shown in FIG. 17A, the division processing unit 412 acquires the number of low performance VM instances and the number of high performance VM instances in the Worker Role that is being operated as the document processing unit 413 from the fabric controller 303 (step S124). Next, the division processing unit 412 calculates the size of the piece when document data is divided into pieces of which the number is the same as the number of low performance VM instances acquired in step S124 (step S125). Then, the division processing unit 412 determines whether or not the size of the piece calculated in step S125 is greater than a predetermined threshold value (step S126). When the size of the piece calculated in step S125 is greater than a predetermined threshold value, the division processing unit 412 divides document data into pieces of which the number is the same as the number of high performance VM instances acquired in step S124 (step S127). Then, the division processing unit 412 assigns a piece number (numbered sequentially from 1) to each piece.

Next, the division processing unit 412 performs storage processing for the necessary information (step S128). Storage processing for the necessary information will be described below with reference to FIG. 17B. Next, in order to transfer processing to the high performance VM instance in the document processing unit 413, the division processing unit 412 inputs messages, which correspond to the pieces and are the same number as that of the pieces, into the high performance VM document processing queue 4222 (step S129). Then, the process advances to step S133. The message to be input to the high performance VM document processing queue 4222 in step S129 includes a request ID and a piece number. The request ID and the piece number are employed for making the document processing unit 413 access the information required for processing.

When the size of the piece calculated in step S125 is equal to or less than a predetermined threshold value, the division processing unit 412 divides document data into the same number of pieces as the number of low performance VM instances acquired in step S124 (step S130). Then, the division processing unit 412 assigns a piece number (numbered sequentially from 1) to each piece. Next, the division processing unit 412 performs storage processing for the necessary information (step S131). Next, in order to transfer processing to the low performance VM instance in the document processing unit 413, the division processing unit 412 inputs messages, which correspond to the pieces and are the same in number as the pieces, into the low performance VM document processing queue 4221 (step S132). Then, the process advances to step S133. The message to be input to the low performance VM document processing queue 4221 in step S132 includes a request ID and a piece number. The request ID and the piece number are employed for making the document processing unit 413 access the information required for processing.

Next, in order to transfer processing to the coupling processing unit 414, the division processing unit 412 inputs the message into the coupling queue 423 (step S133), and the process returns to step S121. The message to be input to the coupling queue 423 in step S133 includes a request ID. The request ID is employed for making the coupling processing unit 414 access the information required for processing.

FIG. 17B is a flowchart illustrating storage processing for the necessary information performed in steps S128 and S131 shown in FIG. 17A. First, the division processing unit 412 stores the pieces in the processed data storage unit 431 (step S201). In step S201, the division processing unit 412 generates a URI (piece URI) that uniquely identifies the storage location of a piece by combining, for example, the request ID and the piece number, and specifies the generated piece URI as the storage location for each piece.

Next, the division processing unit 412 inserts a record into the document processing table 442 (see FIG. 5B) (step S202). The division processing unit 412 stores the request ID (the request ID to be processed), which is included in the message acquired in step S122 shown in FIG. 17A, in the "request ID" item of the record to be inserted. The division processing unit 412 stores the piece number, which has been assigned to each piece in step S127 or step S130, in the "piece number" item of the record to be inserted. The division processing unit 412 stores the piece URI, which has been specified in step S201, in the "piece URI" item of the record to be inserted. Also, the division processing unit 412 stores "not completed" in the "status" item of the record to be inserted.

Next, the division processing unit 412 updates a record having the request ID corresponding to the request to be processed in the request table 441 (see FIG. 5A) (step S203). More specifically, the division processing unit 412 changes the status of the record to "divided", and writes the number of pieces into which document data is divided. The division processing unit 412 of the present embodiment changes a VM for processing the piece depending on whether or not the size of the piece exceeds a threshold value. This is because the piece having a large size is processed by a high performance VM.

As described with reference to FIGS. 17A and 17B, the division processing unit 412 determines whether or not the size of divided document data (piece) to be generated when document data is divided into the number of the first document processing back-end processing units (low performance VMs) exceeds a predetermined threshold value (step S126). When the size of the divided document data exceeds the threshold value, the division processing unit 412 stores the jobs for the number of high performance VMs in a queue corresponding to the second document processing back-end processing unit (high performance VM) (see step S129). When the size of the divided document data does not exceed the threshold value, the division processing unit 412 stores the jobs for the number of low performance VMs in a queue corresponding to the low performance VM (see step S132).

Figure 18A:
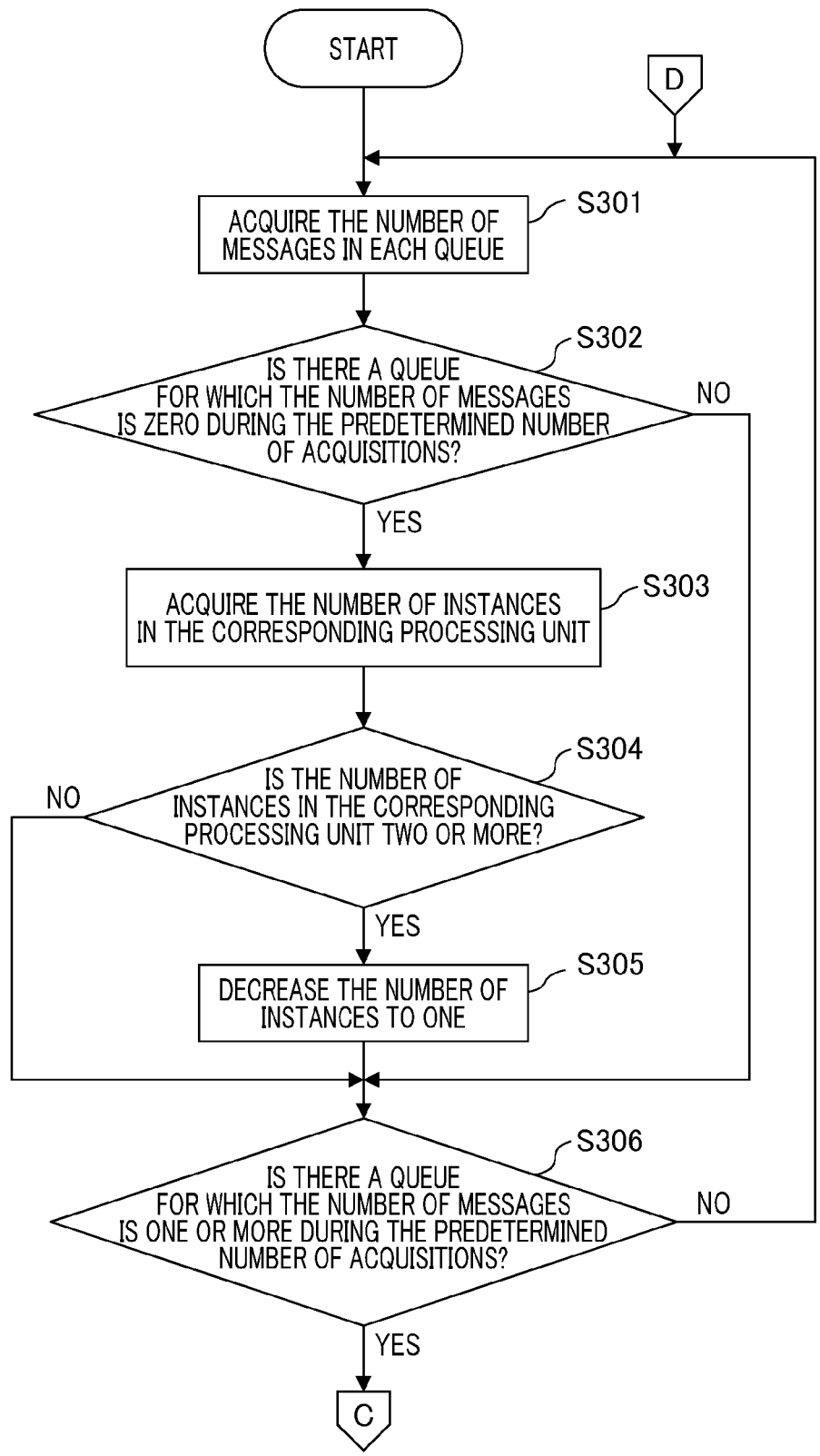

FIGS. 18A and 18B show a flowchart illustrating operation processing performed by a resource management unit provided in the document processing system of the present embodiment. First, the resource management unit 416 waits for a predetermined monitoring interval time. After a lapse of a monitoring interval time, the resource management unit 416 acquires the number of unprocessed messages contained in each of the division queue 421, the low performance VM document processing queue 4221, the high performance VM document processing queue 4222, and the coupling queue 423 (step S301). The resource management unit 416 stores the number of messages for the predetermined number of acquisitions for each queue. Next, the resource management unit 416 determines whether or not there is a queue for which the number of messages is zero during the predetermined number of acquisitions (step S302). When there is no queue for which the number of messages is zero during the predetermined number of acquisitions, the process advances to step S306. On the other hand, when there is a queue for which the number of messages is zero during the predetermined number of acquisitions, the resource management unit 416 acquires the number of instances in the processing unit, which correspond to the queue for which the number of messages is zero during the predetermined number of acquisitions, from the fabric controller 303 (step S303). More specifically, the resource management unit 416 acquires the number of VM instances in the division processing unit 412 when the queue for which the number of messages is zero is the division queue 421. The resource management unit 416 acquires the number of low performance VM instances in the document processing unit 413 when the queue for which the number of messages is zero is the low performance VM document processing queue 4221. The resource management unit 416 acquires the number of high performance VM instances in the document processing unit 413 when the queue for which the number of messages is zero is the high performance VM document processing queue 4222. Also, the resource management unit 416 acquires the number of VM, instances in the coupling processing unit 414 when the queue for which the number of messages is zero is the coupling queue 423.

Next, the resource management unit 416 determines whether or not the number of VM instances acquired in step S303 is two or more (step S304). In determination processing in step S304, the resource management unit 416 separately treats a low performance VM and a high performance VM in the document processing unit 413. When the number of VM instances acquired in step S303 is less than two, the process advances to step S306. On the other hand, when the number of VM instances acquired in step S303 is two or more, the process advances to step S305. Next, the resource management unit 416 provides an instruction to the fabric controller 303 to decrease the number of instances in the VM for which it has been determined that the number of instances is two or more, to one (step S305).

Next, the resource management unit 416 determines whether or not there is a queue for which the number of messages is one or more during the predetermined number of acquisitions (step S306). When there is no queue for which the number of messages is one or more during the predetermined number of acquisitions, the process returns to step S301. On the other hand, when there is a queue for which the number of messages is one or more during the predetermined number of acquisitions, the process advances to step S307 in FIG. 18B.

Next, the resource management unit 416 determines whether or not the high performance VM document processing queue 4222 is included in the queue (see step S306 in FIG. 18A) for which the number of messages has determined to be one or more during the predetermined number of acquisitions (step S307 in FIG. 18B). When the high performance VM document processing queue 4222 is included in the queue for which it has been determined that the number of messages is one or more during the predetermined number of acquisitions, the process advances to step S314. On the other hand, the high performance VM document processing queue 4222 is not included in the queue for which the number of messages has been determined to be one or more during the predetermined number of acquisitions, the process advances to step S308.

In step S308, the resource management unit 416 acquires the number of low performance VM instances in all of the processing units from the fabric controller 303 (step S308). Next, the resource management unit 416 determines whether or not a margin is available with respect to the number of low performance VM instances that can be activated (step S309). More specifically, the resource management unit 416 determines whether or not the total number of low performance VM instances acquired in step S308 is less than the number of low performance VM instances that can be activated by all of the processing units. When the total number of the acquired low performance VM instances is equal to or greater than the number of low performance VM instances that can be activated by all of the processing units, the resource management unit 416 determines that a margin is unavailable with respect to the number of low performance VM instances that can be activated, and the process advances to step S310.

When the total number of the acquired low performance VM instances is less than the number of low performance VM instances that can be activated by all of the processing units, the resource management unit 416 determines that a margin is available with respect to the number of low performance VM instances that can be activated. Then, the process advances to step S313, and the resource management unit 416 performs the following processing. The resource management unit 416 provides an instruction to the fabric controller 303 to increase the number of low performance VM instances in the processing unit, which corresponds to the queue for which it has been determined (step S306 in FIG. 18A) that the number of messages is one or more during the predetermined number of acquisitions, by one. Then, the process returns to step S301 in FIG. 18A.

In step S310, the resource management unit 416 acquires the number of low performance VM initial instances in each of the processing units from the fabric controller 303 (step S310). Next, the resource management unit 416 compares the number of low performance VM instances in each of the processing units acquired in step S308 with the number of low performance VM initial instances in each of the processing units acquired in step S310. Then, the resource management unit 416 determines whether or not there is a processing unit in which the number of the corresponding low performance VM instances exceeds the number of low performance VM initial instances (step S311). When there is no processing unit in which the number of the corresponding low performance VM instances exceeds the number of low performance VM initial instances, the process advances to step S301. On the other hand, when there is a processing unit in which the number of the corresponding low performance VM instances exceeds the number of low performance VM initial instances, the process advances to step S312. The resource management unit 416 provides an instruction to the fabric controller 303 to reduce the number of low performance VM instances in the processing unit, for which it has been determined that the number of the corresponding low performance VM instances exceeds the number of low performance VM initial instances, by one (step S312). Then, the process advances to step S313.

In step S314, the resource management unit 416 performs adjustment processing for the number of high performance VM instances in the document processing unit 413 (step S314). Then, the resource management unit 416 determines whether or not a queue other than the high performance VM document processing queue 4222 is included in the queue (see step S306) for which it has been determined that the number of messages is one or more during the predetermined number of acquisitions (step S315). When a queue other than the high performance VM document processing queue 4222 is included in the queue for which the number of messages has determined to be one or more during the predetermined number of acquisitions, the process advances to step S308. On the other hand, when a queue other than the high performance VM document processing queue 4222 is not included in the queue for which the number of messages has determined to be one or more during the predetermined number of acquisitions, the process returns to step S301 in FIG. 18A.

Figure 19:
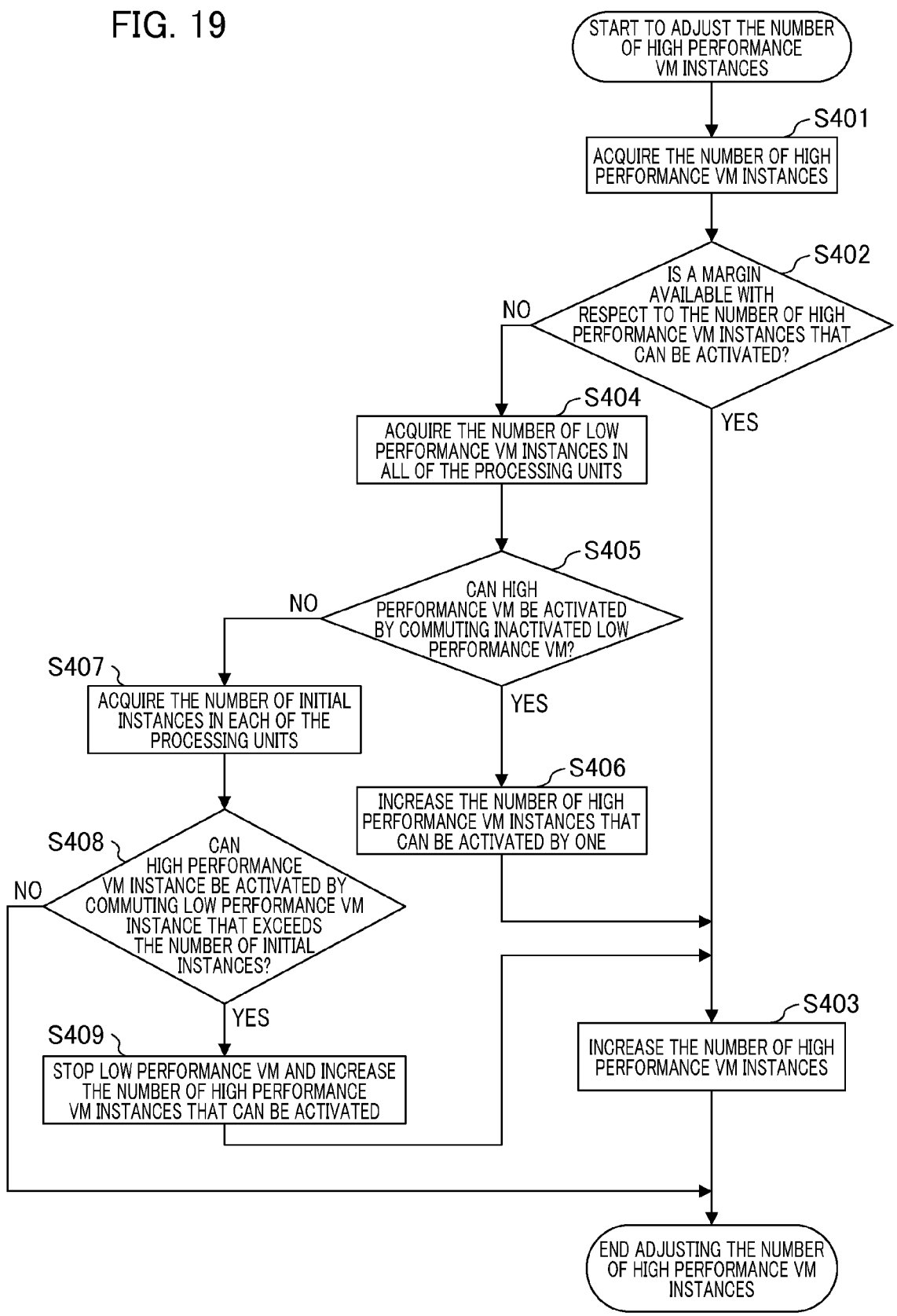
FIG. 19 is a flowchart illustrating adjustment processing for the number of high performance VM instances in a document processing unit.

FIG. 19 is a flowchart illustrating adjustment processing for the number of high performance VM instances in a document processing unit in step S314 in FIG. 18B shown in FIG. 18. First, the resource management unit 416 acquires the number of high performance VM instances in the document processing unit 413 from the fabric controller 303 (step S401). Next, the resource management unit 416 determines whether or not a margin is available with respect to the number of high performance VM instances that can be activated (step S402). More specifically, the resource management unit 416 determines whether or not the number of high performance VM instances acquired in step S401 is less than the number of high performance VM instances that can be activated. When the number of the acquired high performance VM instances is less than the number of high performance VM instances that can be activated, the resource management unit 416 determines that a margin is available with respect to the number of high performance VM instances that can be activated, and the process advances to step S403. On the other hand, when the number of the acquired high performance VM instances is equal to or greater than the number of high performance VM instances that can be activated, the resource management unit 416 determines that a margin is unavailable with respect to the number of high performance VM instances that can be activated, and the process advances to step S404.

In step S403, the resource management unit 416 provides an instruction to the fabric controller 303 to increase the number of high performance VM instances in the document processing unit 413 by one (step S403), and the process is ended. In step S404, the resource management unit 416 acquires the number of low performance VM instances in all of the processing units and the number of low performance VM instances that can be activated by all of the processing units from the fabric controller 303 (step S404). Next, the resource management unit 416 determines whether or not a high performance VM can be activated by commuting an inactivated low performance VM (step S405). More specifically, the resource management unit 416 calculates the value of the number of low performance VM instances, which is obtained by subtracting the number of low performance VM instances in all of the processing units acquired in step S404 from the number of low performance VM instances that can be activated by all of the processing units, as a first reference value. Then, based on a cost (e.g., fee) required for a predetermined high performance VM instance, a cost required for a predetermined low performance VM, and a first reference value, the resource management unit 416 performs the following processing. The resource management unit 416 determines whether or not the first reference value is equal to or greater than the number of low performance VM instances that are required for activating a high performance VM instance. When the first reference value is less than the number of low performance VM instances that are required for activating a high performance VM instance, the resource management unit 416 determines that a high performance VM cannot be activated by commuting an inactivated low performance VM, and the process advances to step S407. On the other hand, when the first reference value is equal to or greater than the number of low performance VM instances that are required for activating a high performance VM instance, the resource management unit 416 determines that a high performance VM can be activated by commuting an inactivated low performance VM, and the process advances to step S406.

In step S406, the resource management unit 416 provides an instruction to the fabric controller 303 to increase the number of high performance VM instances that can be activated by one (step S406), and the process advances to step S403. In step S406, the resource management unit 416 further provides an instruction to the fabric controller 303 to reduce the number of low performance VM instances that can be activated by the number of high performance VM instances to be increased.

In step S407, the resource management unit 416 acquires the number of low performance VM initial instances in each of the processing units from the fabric controller 303 (step S407). Next, the resource management unit 416 determines whether or not a high performance VM instance can be activated by commuting a low performance VM instance that is being activated while exceeding the number of initial instances (step S408). More specifically, the resource management unit 416 calculates the number of low performance VM instances, which are being activated while exceeding the number of initial instances, in each of the processing units. The resource management unit 416 calculates the total value of the number of low performance VM instances calculated for each of the processing units. Also, the resource management unit 416 calculates a value, in which the total value of the number of the calculated low performance VM instances is added to the number of the inactivated low performance VM instances, as a second reference value. Then, the resource management unit 416 determines whether or not a second reference value is equal to or greater than the number of low performance VM instances that are required for activating a high performance VM instance.

When the second reference value is equal to or greater than the number of low performance VM instances that are required for activating a high performance VM instance, the resource management unit 416 performs the following processing. The resource management unit 416 determines that a high performance VM instance can be activated by commuting a low performance VM instance that is being activated while exceeding the number of initial instances, and the process advances to step S409. When the second reference value is less than the number of low performance VM instances that are required for activating a high performance VM instance, the resource management unit 416 performs the following processing. The resource management unit 416 determines that a high performance VM instance cannot be activated by commuting a low performance VM instance that is being activated while exceeding the number of initial instances, and the process is ended.

In step S409, the resource management unit 416 specifies a processing unit, which corresponds to a low performance VM instance that exceeds the number of initial instances by the greatest number, with respect to the fabric controller 303. The resource management unit 416 provides an instruction to the fabric controller 303 to increase the number of high performance VM instances that can be activated by one, and halting the number of low performance VM instances in the specified processing unit by the number of low performance VM instances that have been increased. The resource management unit 416 provides an instruction repeatedly until the value obtained by adding the number of low performance VM instances that have been halted to the first reference value becomes the number of low performance VM instances that are required for activating a high performance VM instance. Then, the process advances to step S403.

While in the present embodiment, only the document processing unit 413 has VMs that are different in performance, the division processing unit 412 and the coupling processing unit 414 may also have VMs that are different in performance. When the division processing unit 412 and the coupling processing unit 414 have VMs that are different in performance, queues (the division queue 421 and the coupling queue 423) are divided for each VM performance, and processing performed by a processing unit corresponding to each queue is changed. According to the fifth embodiment, document data division processing can be performed in response to the difference in VM performance. Also, the number of instances in VMs having different performance can be adjusted depending on the cost (e.g., fee) of VMs having different performance.

According to the cloud computing system of the present invention described above, data to be processed can be divided and processed upon reception of a document data processing request to thereby couple the processing results. The system can also increase or decrease the number of processing executing entities depending on the state of processing.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-114353 filed May 18, 2010, which is hereby incorporated by reference herein in its entirety.

What is claimed is:

1. A cloud computing system comprising a processor coupled to a memory and programmed to provide:
    a request reception unit configured to be realized by executing a request reception program that stores a message corresponding to a job in the memory in response to receipt of a processing request for the job from an image forming apparatus;
    a back-end processing unit configured to be realized by executing a back-end processing program that makes an acquisition request for the message to the memory at regular intervals, and, when the message has been acquired from the memory, performs processing based on the acquired message,
    wherein the back-end processing unit includes:
        a division processing back-end processing sub-unit configured to generate divided document data by dividing document data corresponding to the processing request received by the request reception unit,
        a document processing back-end processing sub-unit configured to perform document processing for the divided document data to generate document-processed divided document data, and
        a coupling processing back-end processing sub-unit configured to couple the document-processed divided document data; and
    a management unit configured to provide instructions to increase or decrease a number of division processing back-end processing sub-units, a number of document processing back-end processing sub-units, and a number of coupling processing back-end processing sub-units in response to a processing status of each of the sub-units of the back-end processing unit, respectively, wherein the document processing back-end processing sub-unit includes a first document processing back-end processing sub-unit having a first processing performance and a second document processing back-end processing sub-unit having a second processing performance that is higher than the first processing performance, and wherein the division processing back-end processing sub-unit determines whether or not a size of divided document data to be generated when the document data is divided into a number of first document processing back-end processing sub-units exceeds a predetermined threshold value, stores jobs for a number of second document processing back-end processing sub-units in a storage unit corresponding to the second document processing back-end processing sub-unit when the size of the divided document data exceeds the threshold value, and stores jobs for the number of first document processing back-end processing sub-units in a queue corresponding to the first document processing back-end processing sub-unit when the size of the divided document data does not exceed the threshold value.

2. The cloud computing system according to claim 1, wherein the memory includes storage units corresponding respectively to each of the division processing back-end processing sub-unit, the document processing back-end processing sub-unit, and the coupling processing back-end processing sub-unit, and wherein, for each storage unit, the management unit increases or decreases a number of sub-units corresponding to the storage unit based on a number of jobs stored in the storage unit, or a storage time of a job in the storage unit.

3. The cloud computing system according to claim 2, wherein, for each storage unit, the management unit decreases the number of sub-units corresponding to the storage unit when the number of jobs stored in the storage unit is equal to or less than a predetermined threshold value, and increases the number of sub-units corresponding to the storage unit when the number of jobs stored in the storage unit exceeds a predetermined threshold value.

4. A document processing method comprising steps of:
storing a message corresponding to a job in a memory in response to receipt of a processing request for the job from an image forming apparatus using a request reception unit configured to be realized by executing a request reception program;
making an acquisition request for the message to the memory at regular intervals;
performing a processing based on a message acquired from the memory, using a back-end processing unit configured to be realized by executing a back-end processing program, the processing including:
generating divided document data by dividing document data corresponding to the processing request using a division processing back-end processing sub-unit of the back-end processing unit,
performing document processing for the divided document data using a document processing back-end processing sub-unit of the back-end processing unit to generate document-processed divided document data, wherein the document processing back-end processing sub-unit includes a first document processing back-end processing sub-unit having a first processing performance and a second document processing back-end processing sub-unit having a second processing performance that is higher than the first processing performance,
coupling the document-processed divided document data using a coupling processing back-end processing sub-unit of the back-end processing unit,
increasing or decreasing a number of division processing back-end processing sub-units, a number of document processing back-end processing sub-units, and a number of coupling processing back-end processing sub-units, in response to a processing status of each of the sub-units of the back-end processing unit, respectively;
determining whether or not a size of divided document data to be generated when the document data is divided into a number of first document processing back-end processing sub-units exceeds a predetermined threshold value;
storing jobs for a number of second document processing back-end processing sub-units in a storage unit corresponding to the second document processing back-end processing sub-unit when the size of the divided document data exceeds the threshold value; and
storing jobs for the number of first document processing back-end processing sub-units in a queue corresponding to the first document processing back-end processing sub-unit when the size of the divided document data does not exceed the threshold value.

5. A non-transitory storage medium storing a computer-readable program for causing a computer to execute a document processing method comprising steps of:
storing a message corresponding to a job in a memory in response to receipt of a processing request for the job from an image forming apparatus using a request reception unit configured to be realized by executing a request reception program;
making an acquisition request for the message to the memory at regular intervals;
performing a processing based on a message acquired from the memory, using a back-end processing unit configured to be realized by executing a back-end processing program, the processing including:
generating divided document data by dividing document data corresponding to the processing request using a division processing back-end processing sub-unit of the back-end processing unit,
performing document processing for the divided document data using a document processing back-end processing sub-unit of the back-end processing unit to generate document-processed divided document data, wherein the document processing back-end processing sub-unit includes a first document processing back-end processing sub-unit having a first processing performance and a second document processing back-end processing sub-unit having a second processing performance that is higher than the first processing performance,
coupling the document-processed divided document data using a coupling processing back-end processing sub-unit of the back-end processing unit,
increasing or decreasing a number of division processing back-end processing sub-units, a number of document processing back-end processing sub-units, and a number of coupling processing back-end processing sub-units, in response to a processing status of each of the sub-units of the back-end processing unit, respectively;

determining whether or not a size of divided document data to be generated when the document data is divided into a number of first document processing back-end processing sub-units exceeds a predetermined threshold value;

storing jobs for a number of second document processing back-end processing sub-units in a storage unit corresponding to the second document processing back-end processing sub-unit when the size of the divided document data exceeds the threshold value; and storing jobs for the number of first document processing back-end processing sub-units in a queue corresponding to the first document processing back-end processing sub-unit when the size of the divided document data does not exceed the threshold value.

* * * * *